US010222563B2

(12) United States Patent
Haase et al.

(10) Patent No.: US 10,222,563 B2
(45) Date of Patent: Mar. 5, 2019

(54) MULTIMODE OPTICAL CONNECTOR

(71) Applicant: 3M INNOVATIVE PROPERTIES COMPANY, St. Paul, MN (US)

(72) Inventors: Michael A. Haase, St. Paul, MN (US); Bing Hao, Woodbury, MN (US); Terry L. Smith, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/105,687

(22) PCT Filed: Dec. 9, 2014

(86) PCT No.: PCT/US2014/069282
§ 371 (c)(1),
(2) Date: Jun. 17, 2016

(87) PCT Pub. No.: WO2015/094811
PCT Pub. Date: Jun. 25, 2015

(65) Prior Publication Data
US 2016/0320568 A1    Nov. 3, 2016

Related U.S. Application Data

(60) Provisional application No. 61/918,157, filed on Dec. 19, 2013.

(51) Int. Cl.
*G02B 6/42*    (2006.01)
*G02B 6/38*    (2006.01)

(52) U.S. Cl.
CPC ......... *G02B 6/4204* (2013.01); *G02B 6/4214* (2013.01); *G02B 6/3829* (2013.01);
(Continued)

(58) Field of Classification Search
CPC ............................ G02B 6/4204; G02B 6/4214
(Continued)

(56) References Cited

U.S. PATENT DOCUMENTS 5,836,667 A    11/1998 Baker et al.
6,075,612 A     6/2000 Mandella
(Continued)

FOREIGN PATENT DOCUMENTS

JP     2004-361904    12/2004
WO    WO 2004/001485    12/2003
(Continued)

OTHER PUBLICATIONS

Wikipedia article "Parabola".*
(Continued)

*Primary Examiner* — Robert Tavlykaev
(74) *Attorney, Agent, or Firm* — Robert S. Moshrefzadeh

(57) ABSTRACT

The disclosure generally relates to individual optical waveguides, sets of optical waveguides such as optical fiber ribbons, and fiber optic connectors useful for connecting individual optical waveguides or multiple optical fibers such as in optical fiber ribbon cables. In particular, the disclosure provides an efficient, compact, and reliable optical fiber connector that exhibits a low insertion loss for use with multimode optical waveguides. The optical connectors incorporate a unitary light coupling unit combining the features of optical fiber alignment, along with redirecting and shaping of the optical beam.

20 Claims, 6 Drawing Sheets

(52) U.S. Cl.
CPC .......... *G02B 6/3882* (2013.01); *G02B 6/3885* (2013.01); *G02B 6/4292* (2013.01)

(58) Field of Classification Search
USPC .............................................. 385/32, 47, 50
See application file for complete search history.

(56) References Cited

U.S. PATENT DOCUMENTS

| | | | | |
|---|---|---|---|---|
| 6,075,913 A * | 6/2000 | Cohen | .................. | G02B 6/4214 385/47 |
| 6,227,682 B1 * | 5/2001 | Li | ........................ | G02B 6/0006 362/293 |
| 6,672,740 B1 * | 1/2004 | Li | ........................ | F21V 7/0025 362/201 |
| 6,832,031 B2 * | 12/2004 | Smaglinski | ............ | G02B 6/262 385/15 |
| 6,898,353 B2 * | 5/2005 | Li | ........................ | G02B 6/0006 348/E9.027 |
| 6,956,995 B1 * | 10/2005 | Shafaat | .................... | G02B 6/32 385/33 |
| 9,692,202 B2 * | 6/2017 | Behfar | .................. | H01S 5/0071 |
| 2003/0021530 A1 * | 1/2003 | Li | ........................ | G02B 6/0006 385/31 |
| 2004/0052462 A1 * | 3/2004 | Buermann | ............. | G02B 6/262 385/47 |
| 2004/0175072 A1 | 9/2004 | Lam | | |
| 2006/0215963 A1 * | 9/2006 | Hamano | .................. | G02B 6/30 385/49 |
| 2006/0263035 A1 | 11/2006 | Fein | | |
| 2007/0237459 A1 | 10/2007 | Watte | | |
| 2013/0156373 A1 | 6/2013 | Lin | | |
| 2015/0355420 A1 * | 12/2015 | Li | ........................ | G02B 6/3648 385/35 |
| 2016/0202427 A1 * | 7/2016 | Smith | .................. | G02B 6/3604 385/26 |
| 2016/0377821 A1 * | 12/2016 | Vallance | .............. | G02B 6/4214 385/28 |

FOREIGN PATENT DOCUMENTS

| | | |
|---|---|---|
| WO | WO 2013-048730 | 4/2013 |
| WO | WO 2013-048743 | 4/2013 |
| WO | WO 2013-180943 | 12/2013 |
| WO | WO 2014-055226 | 4/2014 |
| WO | WO 2014-055361 | 4/2014 |

OTHER PUBLICATIONS

The Wikipedia article "Toroidal reflector", available online since at least 2009.*
The article "Surfaces of Revolution" in the Encyclopedia of Analytical Surfaces, pp. 99-135, 2015.*
International Search Report for PCT International Application No. PCT/US2014/069282, dated Mar. 30, 2015, 3 pgs.

* cited by examiner

MULTIMODE OPTICAL CONNECTOR

CROSS REFERENCE TO RELATED APPLICATIONS

This application is a national stage filing under 35 U.S.C. 371 of PCT/US2014/069282, filed Dec. 9, 2014, which claims the benefit of U.S. Application No. 61/918,157, filed Dec. 19, 2013, the disclosure of which is incorporated by reference in its/their entirety herein.

BACKGROUND

Optical fiber connectors can be used to connect optical fibers in a variety of applications including: telecommunications networks, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust on the tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the end of the receiving fiber. This type of connector is less sensitive to dust and other forms of contamination that may be present in the region where the beam is expanded to the larger diameter.

Backplane optical connectors will become essential components of high-performance computers, data centers, and telecom switching systems in the near future, as line rates of data transmission migrate from the current 10 Gb/sec/line to 25 Gb/sec/line in the next few years. It would be advantageous to provide expanded beam connectors that are lower cost and higher performance alternatives to existing optical and copper connections that are currently being used in the 10 Gb/sec interconnects.

SUMMARY

The disclosure generally relates to individual optical waveguides, sets of optical waveguides such as optical fiber ribbons, and fiber optic connectors useful for connecting individual optical waveguides or multiple optical fibers such as in optical fiber ribbon cables. In particular, the disclosure provides an efficient, compact, and reliable optical fiber connector that exhibits a low insertion loss for use with multimode optical waveguides. The optical connectors incorporate a unitary light coupling unit combining the features of optical fiber alignment, along with redirecting and shaping of the optical beam.

In one aspect, the present disclosure provides a unitary light coupling unit for use in an optical connector that includes a waveguide alignment member for receiving and aligning an optical waveguide, and a light redirecting member. The light redirecting member includes an input surface for receiving input light from an optical waveguide disposed and aligned at the waveguide alignment member; and a toroidal surface for receiving light from the input surface propagating along an input axis and reflecting the received light, the reflected light propagating along a different redirected axis, a second divergence of the reflected light being less than a first divergence of the input light along two mutually orthogonal divergence directions. The light redirecting member further includes an output surface for receiving light from the toroidal surface and transmitting the received light as output light exiting the light redirecting member propagating along an output axis, a curved intersection of the toroidal surface and a first plane formed by the input and redirected axes having a radius of curvature, the toroidal surface having an axis of revolution disposed in the first plane at the input surface and a focal length measured from the axis of revolution to the toroidal surface along the input axis, the focal length being less than the radius of curvature. In another aspect, the present disclosure provides such a first unitary light coupling unit having a first optical waveguide received and aligned by the waveguide alignment member of the first unitary light coupling unit mated with such a second unitary light coupling unit having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

In yet another aspect, the present disclosure provides a unitary light coupling unit for use in an optical connector that includes a waveguide alignment member for receiving and aligning an optical waveguide, and a solid light redirecting member. The solid light redirecting member includes an input surface for receiving input light from an optical waveguide disposed and aligned at the waveguide alignment member; and a reflecting surface for receiving light from the input surface propagating along an input axis and reflecting the received light, the reflected light propagating along a different redirected axis, a second divergence of the reflected light being less than a first divergence of the input light along two mutually orthogonal divergence directions. The solid light redirecting member still further includes an output surface for receiving light from the reflecting surface and transmitting the received light as output light exiting the light redirecting member propagating along an output axis, wherein the reflecting surface comprises a reflective coating, and wherein without the reflective coating at least a portion of the light received by the reflecting surface from the input surface does not undergo total internal reflection at the reflecting surface. In yet another aspect, the present disclosure provides a connector assembly that includes such a first unitary light coupling unit having a first optical waveguide received and aligned by the waveguide alignment member of the first unitary light coupling unit mated with such a second unitary light coupling unit having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

In yet another aspect, the present disclosure provides a unitary light coupling unit for use in an optical connector that includes a waveguide alignment member for receiving and aligning an optical waveguide, and a light redirecting member. The light redirecting member includes an input surface for receiving input light from an optical waveguide disposed and aligned at the waveguide alignment member; and a reflecting surface for receiving light from the input surface as an incident light propagating along an input axis and reflecting the incident light as a reflected light propagating along a different redirected axis, a second divergence of the reflected light being less than a first divergence of the input light along two mutually orthogonal divergence directions. The light redirecting member still further includes an output surface for receiving the reflected light and transmitting the received light as output light exiting the light redirecting member propagating along an output axis, wherein an angle between the incident and reflected lights is less than 90 degrees. In yet another aspect, the present disclosure provides a connector assembly that includes such a first unitary light coupling unit having a first optical waveguide received and aligned by the waveguide alignment member of the first unitary light coupling unit mated with such a second unitary light coupling unit having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

In yet another aspect, the present disclosure provides a connector assembly having mated first and second optical connectors, each optical connector including a multimode optical waveguide having an exit face, and a unitary light redirecting member. The unitary light redirecting member includes a first surface disposed at and facing the exit face of the multimode optical fiber; a second surface disposed at and facing the second surface of the unitary light redirecting member of other optical connector; and a reflecting surface for receiving light from one of the first and second surfaces and reflecting the received light toward the other of the first and second surfaces, wherein an optical insertion loss of the connector assembly at a wavelength in a range from 600 to 2000 nanometers is less than 0.5 dB.

In yet another aspect, the present disclosure provides an optical assembly that includes an optical fiber being multimode in a wavelength range from 600 to 2000 nm and having an exit face and configured to receive or emit light along a first optical axis; a toroidal surface; and an optical transceiver configured to receive or emit light along a different second optical axis, the optical assembly being configured so that light propagating from one of the optical fiber and transceiver to the other one of the optical fiber and transceiver undergoes reflection at the toroidal surface, a curved intersection of the toroidal surface and a first plane formed by the first and second optical axes having a radius of curvature, the toroidal surface having an axis of revolution disposed in the first plane at the exit face and a focal length measured from the axis of revolution to the toroidal surface along the first optical axis, the focal length being less than the radius of curvature.

LISTING OF EXEMPLARY EMBODIMENTS

Exemplary embodiments are listed below. It is to be understood that any of embodiments 1-35, 36-39, 40-71, 72-108, 109-116, and 117-122 can be combined.

Embodiment 1

A unitary light coupling unit for use in an optical connector, comprising:
a waveguide alignment member for receiving and aligning an optical waveguide; and
a light redirecting member, comprising:
an input surface for receiving input light from an optical waveguide disposed and aligned at the waveguide alignment member;
a toroidal surface for receiving light from the input surface propagating along an input axis and reflecting the received light, the reflected light propagating along a different redirected axis, a second divergence of the reflected light being less than a first divergence of the input light along two mutually orthogonal divergence directions; and
an output surface for receiving light from the toroidal surface and transmitting the received light as output light exiting the light redirecting member propagating along an output axis, a curved intersection of the toroidal surface and a first plane formed by the input and redirected axes having a radius of curvature, the toroidal surface having an axis of revolution disposed in the first plane at the input surface and a focal length measured from the axis of revolution to the toroidal surface along the input axis, the focal length being less than the radius of curvature.

Embodiment 2

The unitary light coupling unit of embodiment 1, wherein the axis of revolution is substantially parallel to the redirected axis.

Embodiment 3

The unitary light coupling unit of any preceding embodiment, wherein the optical connector is configured to mate with a mating optical connector along a mating direction, the mating direction not being parallel with the input axis.

Embodiment 4

The unitary light coupling unit of any preceding embodiment, wherein the optical connector is configured to mate with a mating optical connector along a mating direction, the mating direction being parallel with the input axis.

Embodiment 5

The unitary light coupling unit of any preceding embodiment, wherein the optical connector comprises an input face different than the input surface.

Embodiment 6

The unitary light coupling unit of any preceding embodiment, wherein the optical connector comprises an output face different than the output surface.

Embodiment 7

The unitary light coupling unit of any preceding embodiment, wherein the optical connector is hermaphroditic.

Embodiment 8

The unitary light coupling unit of any preceding embodiment, wherein the waveguide alignment member comprises a groove extending along a groove direction for receiving and aligning an optical waveguide.

Embodiment 9

The unitary light coupling unit of embodiment 8, wherein the groove direction is parallel to and aligned with the input axis.

Embodiment 10

The unitary light coupling unit of any preceding embodiment, wherein the optical waveguide comprises an optical fiber.

Embodiment 11

The unitary light coupling unit of embodiment 10, wherein the waveguide alignment member comprises a cylindrical hole capable of receiving the optical fiber.

Embodiment 12

The unitary light coupling unit of any preceding embodiment, wherein the optical waveguide is multimode for wavelengths in a range from 600 to 2000 nanometers.

Embodiment 13

The unitary light coupling unit of any preceding embodiment, wherein the optical waveguide has a circular cross-sectional profile.

Embodiment 14

The unitary light coupling unit of any preceding embodiment, wherein the optical waveguide has a polygonal cross-sectional profile.

Embodiment 15

The unitary light coupling unit of any preceding embodiment, wherein a central light ray exiting the optical waveguide received and aligned by the waveguide alignment member propagates along a central axis between the optical waveguide and the input surface, the central axis being parallel to and aligned with the input axis.

Embodiment 16

The unitary light coupling unit of any preceding embodiment further comprising an optical waveguide received and aligned by the waveguide alignment member, and an index matching material optically coupling the optical waveguide to the input surface.

Embodiment 17

The unitary light coupling unit of any preceding embodiment, wherein the input surface is planar.

Embodiment 18

The unitary light coupling unit of any preceding embodiment, wherein the input surface is substantially perpendicular to the input axis.

Embodiment 19

The unitary light coupling unit of any preceding embodiment, wherein the input surface is substantially perpendicular to the output surface.

Embodiment 20

The unitary light coupling unit of any preceding embodiment, wherein light exiting an optical waveguide received and aligned by the waveguide alignment member propagates along an optical path from the input surface to the output surface, an index of refraction of unitary light coupling unit along the entire optical path being greater than one.

Embodiment 21

The unitary light coupling unit of any preceding embodiment, wherein the light redirecting member is a solid medium having an index of refraction greater than one.

Embodiment 22

The unitary light coupling unit of any preceding embodiment, wherein an angle between the input axis and the redirected axis is less than 90 degrees.

Embodiment 23

The unitary light coupling unit of any preceding embodiment, wherein an angle between the input axis and the redirected axis is greater than 90 degrees.

Embodiment 24

The unitary light coupling unit of any preceding embodiment, wherein an angle between the input axis and the redirected axis is 111 degrees.

Embodiment 25

The unitary light coupling unit of any preceding embodiment, wherein the second divergence of the reflected light is less than the first divergence of the input light along each of the two mutually orthogonal divergence directions by at least 1 degree.

Embodiment 26

The unitary light coupling unit of any preceding embodiment, wherein light exiting an optical waveguide received and aligned by the waveguide alignment member and reflected by the toroidal surface propagates from the toroidal surface to the output surface, the reflected light having a minimum beam size located substantially at the output surface.

Embodiment 27

The unitary light coupling unit of any preceding embodiment, wherein the toroidal surface reflects the received light by total internal reflection.

Embodiment 28

The unitary light coupling unit of any preceding embodiment, wherein the toroidal surface comprises a Bragg reflector.

Embodiment 29

The unitary light coupling unit of any preceding embodiment, wherein the toroidal surface comprises a metal reflector.

Embodiment 30

The unitary light coupling unit of any preceding embodiment, wherein the output axis lies in the first plane.

Embodiment 31

The unitary light coupling unit of any preceding embodiment, wherein the output surface is substantially planar.

Embodiment 32

The unitary light coupling unit of any preceding embodiment, wherein the output surface is substantially perpendicular to the output axis.

Embodiment 33

The unitary light coupling unit of any preceding embodiment, wherein light exiting an optical waveguide received and aligned by the waveguide alignment member has first beam size at the input surface and a second beam size at the output surface, the second beam size being greater than the first beam size.

Embodiment 34

The unitary light coupling unit of embodiment 33, wherein the second beam size is greater than about 2 times the first beam size.

Embodiment 35

The unitary light coupling unit of any preceding embodiment, wherein within the light redirecting member the input light is divergent and the reflected light is convergent or substantially collimated.

Embodiment 36

A connector assembly, comprising:
a first unitary light coupling unit of any preceding embodiment having a first optical waveguide received and aligned by the waveguide alignment member of the first unitary light coupling unit mated with a second unitary light coupling unit of any preceding embodiment having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Embodiment 37

The connector assembly of embodiment 36, wherein light exiting the first optical waveguide propagates a first propagation distance between the input surface of the first unitary light coupling unit and the input surface of the second unitary light coupling unit, the propagation distance being substantially equal to two times a sum of the focal length of the first unitary light coupling unit and the focal length of the second unitary light coupling unit.

Embodiment 38

The connector assembly of any one of embodiments 36-37, wherein the focal length of the first unitary light coupling unit is substantially equal to the focal length of the second unitary light coupling unit.

Embodiment 39

The connector assembly of any one of embodiments 36-38, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Embodiment 40

A unitary light coupling unit for use in an optical connector, comprising:
a waveguide alignment member for receiving and aligning an optical waveguide; and
a solid light redirecting member comprising:
an input surface for receiving input light from an optical waveguide disposed and aligned at the waveguide alignment member;
a reflecting surface for receiving light from the input surface propagating along an input axis and reflecting the received light, the reflected light propagating along a different redirected axis, a second divergence of the reflected light being less than a first divergence of the input light along two mutually orthogonal divergence directions; and
an output surface for receiving light from the reflecting surface and transmitting the received light as output light exiting the light redirecting member propagating along an output axis, wherein the reflecting surface comprises a reflective coating, and wherein without the reflective coating at least a portion of the light received by the reflecting surface from the input surface does not undergo total internal reflection at the reflecting surface.

Embodiment 41

The unitary light coupling unit of embodiment 40, wherein the reflective coating comprises a metal.

Embodiment 42

The unitary light coupling unit of any one of embodiments 40-41, wherein the optical connector is configured to mate with a mating optical connector along a mating direction, the mating direction not being parallel with the input axis.

Embodiment 43

The unitary light coupling unit of any one of embodiments 40-42, wherein the optical connector is configured to mate with a mating optical connector along a mating direction, the mating direction being parallel with the input axis.

Embodiment 44

The unitary light coupling unit of any one of embodiments 40-43, wherein the optical connector comprises an input face different than the input surface.

Embodiment 45

The unitary light coupling unit of any one of embodiments 40-44, wherein the optical connector comprises an output face different than the output surface.

Embodiment 46

The unitary light coupling unit of any one of embodiments 40-45, wherein the optical connector is hermaphroditic.

Embodiment 47

The unitary light coupling unit of any one of embodiments 40-46, wherein the waveguide alignment member comprises a groove extending along a groove direction for receiving and aligning an optical waveguide.

Embodiment 48

The unitary light coupling unit of embodiment 47, wherein the groove direction is parallel to and aligned with the input axis.

Embodiment 49

The unitary light coupling unit of any one of embodiments 40-48, wherein the optical waveguide comprises an optical fiber.

Embodiment 50

The unitary light coupling unit of embodiment 49, wherein the waveguide alignment member comprises a cylindrical hole capable of receiving the optical fiber.

Embodiment 51

The unitary light coupling unit of any one of embodiments 40-50, wherein the optical waveguide is multimode for wavelengths in a range from 600 to 2000 nanometers.

Embodiment 52

The unitary light coupling unit of any one of embodiments 40-51, wherein the optical waveguide has a circular cross-sectional profile.

Embodiment 53

The unitary light coupling unit of any one of embodiments 40-52, wherein the optical waveguide has a polygonal cross-sectional profile.

Embodiment 54

The unitary light coupling unit of any one of embodiments 40-53, wherein a central light ray exiting the optical waveguide received and aligned by the waveguide alignment member propagates along a central axis between the optical waveguide and the input surface, the central axis being parallel to and aligned with the input axis.

Embodiment 55

The unitary light coupling unit of any one of embodiments 40-54, further comprising an optical waveguide received and aligned by the waveguide alignment member, and an index matching material optically coupling the optical waveguide to the input surface.

Embodiment 56

The unitary light coupling unit of any one of embodiments 40-55, wherein the input surface is planar.

Embodiment 57

The unitary light coupling unit of any one of embodiments 40-56, wherein the input surface is substantially perpendicular to the input axis.

Embodiment 58

The unitary light coupling unit of any one of embodiments 40-57, wherein the input surface is substantially perpendicular to the output surface.

Embodiment 59

The unitary light coupling unit of any one of embodiments 40-58, wherein an angle between the input axis and the redirected axis is less than 90 degrees.

Embodiment 60

The unitary light coupling unit of any one of embodiments 40-59, wherein the second divergence of the reflected light is less than the first divergence of the input light along each of the two mutually orthogonal divergence directions by at least 1 degree.

Embodiment 61

The unitary light coupling unit of any one of embodiments 40-60, wherein light exiting an optical waveguide received and aligned by the waveguide alignment member and reflected by the reflecting surface propagates along an optical path from the reflecting surface to the output surface, the reflected light having a minimum beam size located substantially at the output surface.

Embodiment 62

The unitary light coupling unit of any one of embodiments 40-61, wherein the reflective coating comprises a Bragg reflector.

Embodiment 63

The unitary light coupling unit of any one of embodiments 40-62, wherein the reflecting surface comprises a toroidal surface, a parabolic surface, a spherical surface, a hyperbolic surface, or an elliptical surface.

Embodiment 64

The unitary light coupling unit of any one of embodiments 40-63, wherein the output axis lies in a first plane formed by the input and redirected axes.

Embodiment 65

The unitary light coupling unit of any one of embodiments 40-64, wherein the output surface is substantially planar.

Embodiment 66

The unitary light coupling unit of any one of embodiments 40-65, wherein the output surface is substantially perpendicular to the output axis.

Embodiment 67

The unitary light coupling unit of any one of embodiments 40-66, wherein light exiting an optical waveguide received and aligned by the waveguide alignment member has first beam size at the input surface and a second beam size at the output surface, the second beam size being greater than the first beam size.

Embodiment 68

The unitary light coupling unit of embodiment 67, wherein the second beam size is greater than about 2 times the first beam size.

Embodiment 69

The unitary light coupling unit of any one of embodiments 40-68, wherein within the light redirecting member the input light is divergent and the reflected light is convergent or substantially collimated.

Embodiment 70

A connector assembly, comprising:
a first unitary light coupling unit of any one of embodiments 40-69 having a first optical waveguide received and aligned by the waveguide alignment member of the first unitary light coupling unit mated with a second unitary light coupling unit of any one of embodiments 40-69 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Embodiment 71

The connector assembly of embodiment 70, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Embodiment 72

A unitary light coupling unit for use in an optical connector, comprising:
a waveguide alignment member for receiving and aligning an optical waveguide; and
a light redirecting member comprising:
an input surface for receiving input light from an optical waveguide disposed and aligned at the waveguide alignment member;
a reflecting surface for receiving light from the input surface as an incident light propagating along an input axis and reflecting the incident light as a reflected light propagating along a different redirected axis, a second divergence of the reflected light being less than a first divergence of the input light along two mutually orthogonal divergence directions; and
an output surface for receiving the reflected light and transmitting the received light as output light exiting the light redirecting member propagating along an output axis, wherein an angle between the incident and reflected lights is less than 90 degrees.

Embodiment 73

The unitary light coupling unit of embodiment 72, wherein the angle between the incident and reflected lights is less than or equal to about 60 degrees.

Embodiment 74

The unitary light coupling unit of any one of embodiments 72-73, wherein the optical connector is configured to mate with a mating optical connector along a mating direction, the mating direction not being parallel with the input axis.

Embodiment 75

The unitary light coupling unit of any one of embodiments 72-74, wherein the optical connector is configured to mate with a mating optical connector along a mating direction, the mating direction being parallel with the input axis.

Embodiment 76

The unitary light coupling unit of any one of embodiments 72-75, wherein the optical connector comprises an input face different than the input surface.

Embodiment 77

The unitary light coupling unit of any one of embodiments 72-76, wherein the optical connector comprises an output face different than the output surface.

Embodiment 78

The unitary light coupling unit of any one of embodiments 72-77, wherein the optical connector is hermaphroditic.

Embodiment 79

The unitary light coupling unit of any one of embodiments 72-78, wherein the waveguide alignment member comprises a groove extending along a groove direction for receiving and aligning an optical waveguide.

Embodiment 80

The unitary light coupling unit of embodiment 79, wherein the groove direction is parallel to and aligned with the input axis.

Embodiment 81

The unitary light coupling unit of any one of embodiments 72-80, wherein the optical waveguide comprises an optical fiber.

Embodiment 82

The unitary light coupling unit of embodiment 81, wherein the waveguide alignment member comprises a cylindrical hole capable of receiving the optical fiber.

Embodiment 83

The unitary light coupling unit of any one of embodiments 72-82, wherein the optical waveguide is multimode for wavelengths in a range from 600 to 2000 nanometers.

Embodiment 84

The unitary light coupling unit of any one of embodiments 72-83, wherein the optical waveguide has a circular cross-sectional profile.

Embodiment 85

The unitary light coupling unit of any one of embodiments 72-84, wherein the optical waveguide has a polygonal cross-sectional profile.

Embodiment 86

The unitary light coupling unit of any one of embodiments 72-85, wherein a central light ray exiting the optical waveguide received and aligned by the waveguide alignment member propagates along an input path between the input surface and the reflecting surface, the input path being parallel to and aligned with the input axis.

Embodiment 87

The unitary light coupling unit of embodiment 86, wherein the central light ray is reflected by the reflecting surface, and further propagates along a reflected path to the output surface, the reflected path and the input path forming the angle of less than 90 degrees.

Embodiment 88

The unitary light coupling unit of any one of embodiments 72-87 further comprising an optical waveguide received and aligned by the waveguide alignment member, and an index matching material optically coupling the optical waveguide to the input surface.

Embodiment 89

The unitary light coupling unit of any one of embodiments 72-88, wherein the input surface is planar.

Embodiment 90

The unitary light coupling unit of any one of embodiments 72-89, wherein the input surface is substantially perpendicular to the input axis.

Embodiment 91

The unitary light coupling unit of any one of embodiments 72-90, wherein the input surface is substantially perpendicular to the output surface.

Embodiment 92

The unitary light coupling unit of any one of embodiments 72-91, wherein light exiting an optical waveguide received and aligned by the waveguide alignment member propagates along an optical path from the input surface to the output surface, an index of refraction of unitary light coupling unit along the entire optical path being greater than one.

Embodiment 93

The unitary light coupling unit of any one of embodiments 72-92, wherein the light redirecting member is a solid medium having an index of refraction greater than one.

Embodiment 94

The unitary light coupling unit of any one of embodiments 72-93, wherein the angle between the input axis and the redirected axis is less than 90 degrees.

Embodiment 95

The unitary light coupling unit of any one of embodiments 72-94, wherein the second divergence of the reflected light is less than the first divergence of the input light along each of the two mutually orthogonal divergence directions by at least 1 degree.

Embodiment 96

The unitary light coupling unit of any one of embodiments 72-95, wherein light exiting an optical waveguide received and aligned by the waveguide alignment member and reflected by the reflecting surface propagates along an optical path from the reflecting surface to the output surface, the reflected light having a minimum beam size located substantially at the output surface.

Embodiment 97

The unitary light coupling unit of any one of embodiments 72-96, wherein the reflecting surface comprises a toroidal surface, a parabolic surface, a spherical surface, a hyperbolic surface, or an elliptical surface.

Embodiment 98

The unitary light coupling unit of any one of embodiments 72-97, wherein the reflecting surface reflects the received light by total internal reflection.

Embodiment 99

The unitary light coupling unit of any one of embodiments 72-98, wherein the reflecting surface comprises a Bragg reflector.

Embodiment 100

The unitary light coupling unit of any one of embodiments 72-99, wherein the reflecting surface comprises a metal reflector.

Embodiment 101

The unitary light coupling unit of any one of embodiments 72-100, wherein the output axis lies in a first plane formed by the input and redirected axes.

Embodiment 102

The unitary light coupling unit of any one of embodiments 72-101, wherein the output surface is substantially planar.

Embodiment 103

The unitary light coupling unit of any one of embodiments 72-102, wherein the output surface is substantially perpendicular to the output axis.

Embodiment 104

The unitary light coupling unit of any one of embodiments 72-103, wherein light exiting an optical waveguide received and aligned by the waveguide alignment member has first beam size at the input surface and a second beam size at the output surface, the second beam size being greater than the first beam size.

Embodiment 105

The unitary light coupling unit of embodiment 104, wherein the second beam size is greater than about 2 times the first beam size.

Embodiment 106

The unitary light coupling unit of any one of embodiments 72-105, wherein within the light redirecting member the input light is divergent and the reflected light is convergent or substantially collimated.

Embodiment 107

A connector assembly, comprising:
a first unitary light coupling unit of any one of embodiments 72-106 having a first optical waveguide received and aligned by the waveguide alignment member of the first unitary light coupling unit mated with a second unitary light coupling unit of any one of embodiments 72-106 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Embodiment 108

The connector assembly of embodiment 107, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Embodiment 109

A connector assembly comprising mated first and second optical connectors, each optical connector comprising:
a multimode optical waveguide having an exit face; and
a unitary light redirecting member comprising:
a first surface disposed at and facing the exit face of the multimode optical waveguide;
a second surface disposed at and facing the second surface of the unitary light redirecting member of the other optical connector; and
a reflecting surface for receiving light from one of the first and second surfaces and reflecting the received light toward the other of the first and second surfaces, wherein an optical insertion loss of the connector assembly at a wavelength in a range from 600 to 2000 nanometers is less than 0.5 dB.

Embodiment 110

The connector assembly of embodiment 109, wherein the reflecting surface of at least one of the first and second optical connectors is a toroidal surface.

Embodiment 111

The connector assembly of any one of embodiments 109-110, wherein the multimode optical waveguide of each of the first and second optical connectors is a multimode optical fiber.

Embodiment 112

The connector assembly of any one of embodiments 109-111, wherein the multimode optical waveguide of at least one optical connector has a circular cross-sectional profile.

Embodiment 113

The connector assembly of any one of embodiments 109-112, wherein the multimode optical waveguide of at least one optical connector has a polygonal cross-sectional profile.

Embodiment 114

The connector assembly of any one of embodiments 109-113, wherein the reflecting surface of at least one of the first and second optical connectors reflects the received light by total internal reflection.

Embodiment 115

The connector assembly of any one of embodiments 109-114, wherein the reflecting surface of at least one of the first and second optical connectors comprises a Bragg reflector.

Embodiment 116

The connector assembly of any one of embodiments 109-115, wherein the reflecting surface of at least one of the first and second optical connectors comprises a metal reflector.

Embodiment 117

An optical assembly comprising:
an optical fiber being multimode in a wavelength range from 600 to 2000 nm and having an exit face and configured to receive or emit light along a first optical axis;
a toroidal surface; and
an optical transceiver configured to receive or emit light along a different second optical axis, the optical assembly being configured so that light propagating from one of the optical fiber and transceiver to the other one of the optical fiber and transceiver undergoes reflection at the toroidal surface, a curved intersection of the toroidal surface and a first plane formed by the first and second optical axes having a radius of curvature, the toroidal surface having an axis of revolution disposed in the first plane at the exit face and a focal length measured from the axis of revolution to the toroidal surface along the first optical axis, the focal length being less than the radius of curvature.

Embodiment 118

The optical assembly of embodiment 117, wherein the optical transceiver comprises an optical detector.

Embodiment 119

The optical assembly of any one of embodiments 117-118, wherein the optical transceiver comprises a vertical cavity surface emitting laser (VCSEL).

Embodiment 120

The optical assembly of any one of embodiments 117-119, wherein the toroidal surface reflects the received light by total internal reflection.

Embodiment 121

The optical assembly of any one of embodiments 117-120, wherein the toroidal surface comprises a Bragg reflector.

Embodiment 122

The optical assembly of any one of embodiments 117-121, wherein the toroidal surface comprises a metal reflector.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
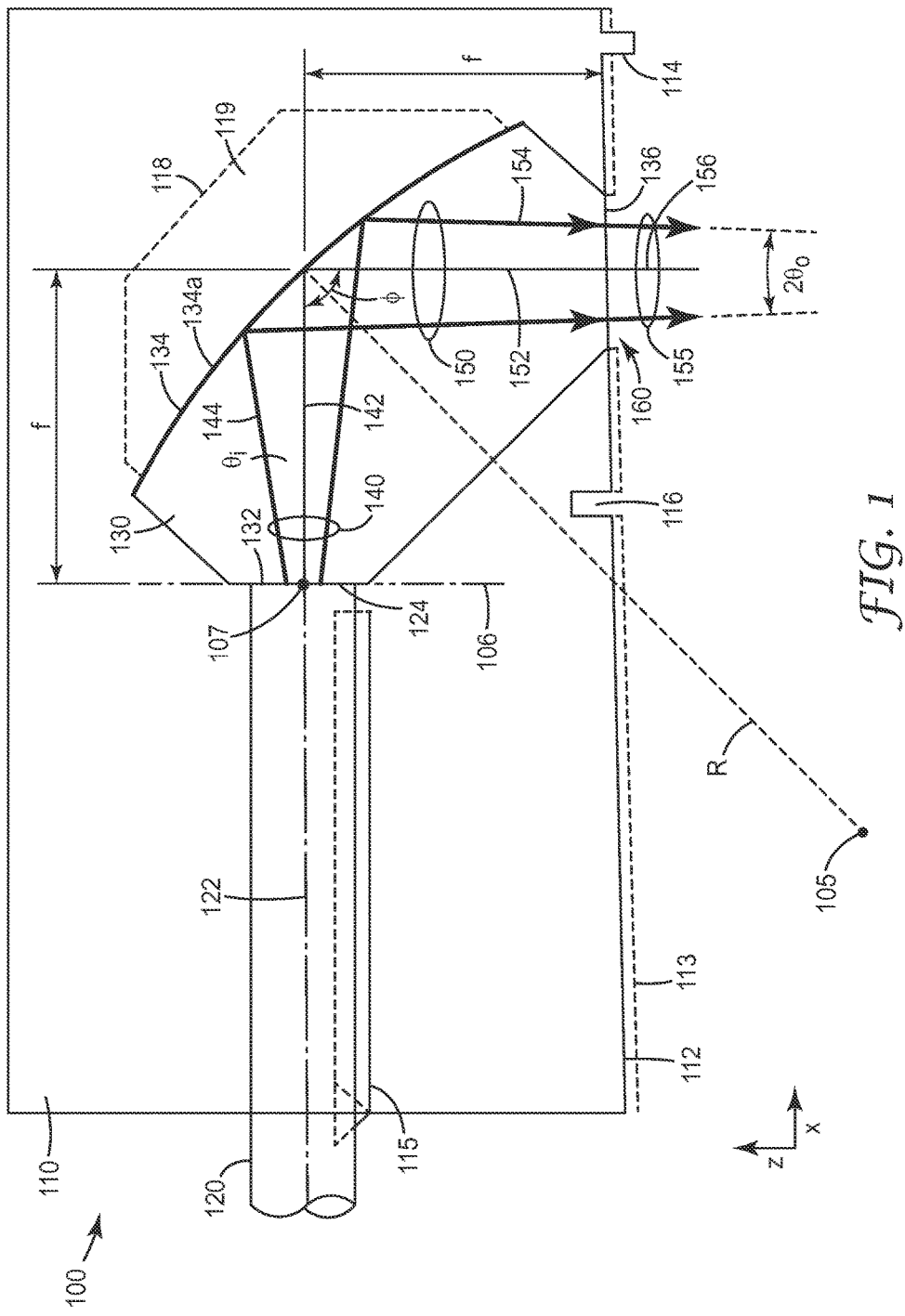
FIG. 1 shows a schematic cross-sectional view of a unitary light coupling unit.

The disclosure generally relates to individual optical waveguides, sets of optical waveguides such as optical fiber ribbons, and fiber optic connectors useful for connecting individual optical waveguides or multiple optical fibers such as in optical fiber ribbon cables. In particular, the disclosure provides an efficient, compact, and reliable optical fiber connector that exhibits a low insertion loss for use with multimode optical waveguides. The optical connectors incorporate a unitary light coupling unit combining the features of optical fiber alignment, along with redirecting and shaping of the optical beam.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

Previous designs for multimode fiber optic connectors have often made use of paraboloid mirrors to turn and approximately collimate light emitted from a fiber. The present inventors have discovered the surprising and unexpected result of significantly lower insertion loss by the use of properly designed toroidal mirrors, due to better management of aberrations, particularly coma. The fabrication of connector ferrules with toroidal mirrors may be achieved by injection molding with mold inserts fabricated by diamond machining or other techniques as known in the art, and can result in vastly improved optical waveguide connections.

In one particular embodiment, one of the benefits of this disclosure is significantly reduced insertion loss through better management of aberrations, particularly coma. Earlier connector designs include, for example, turning and collimating mirrors and lenses; in some cases, a planar mirror has been combined with collimating lenses to expand the input light beam. In some cases, connector designs featuring turning and collimating mirrors typically used paraboloid mirrors, which suffer from loss due to coma associated with the non-zero size of the fiber core (typically 50 μm diameter). The present disclosure has demonstrated that the use of toroidal mirrors in a "4f" design (i.e., the path length through the connector is four times the focal length of the toroidal mirror, as described elsewhere) can significantly reduce the losses due to coma and astigmatism.

In one aspect, the geometry of the toroidal mirror may be described as a surface of revolution of a circular arc, as described elsewhere. The axis of revolution passes through the focal point and is parallel to the collimated reflected beam. The center of the circular arc is located on a line that bisects the angle formed by a ray from the source along the axis of the fiber and the reflection of that ray from the mirror.

Given a light source within the optical waveguide having a point source, paraboloid mirrors could be used to provide a zero-loss connector (in principle). However, given the relatively large multi-mode core (typically 50 microns diameter) in typical optical connectors, the angled reflections can result in astigmatism and coma. We have discovered that the toroidal design described herein provides significantly lower insertion loss than what would be expected from a connector using paraboloid mirrors. In one particular embodiment, the insertion loss using paraboloid mirror is 0.53 dB (11.6%), while the insertion loss using toroidal mirrors is 0.36 dB (8.0%).

In one particular embodiment, the reflecting surfaces may be fabricated such as by molding or casting a feature in a light redirecting member, and may have surfaces that can be aligned at an angle to the optical axis of the optical waveguide. In some cases, the reflective surface can be a curved reflecting element such as a toroidal mirror, a parabolic mirror, a spherical mirror, a hyperbolic mirror, an elliptical mirror, and the like, such that additional focusing optics may not be necessary. In some cases, toroidal reflective surfaces may be preferred. In some cases, the reflective surface may be coated with a reflecting material such as a metal or metal alloy, or a multilayer interference reflector such as a Bragg reflector, to redirect the light. In some cases, the reflective surface may instead enable Total Internal Reflection (TIR) to facilitate redirecting the light.

The redirecting element can be encased in a connector housing that can provide support for the optical cable, ensure alignment of interlocking components of the connector element, and provide protection from the environment. Such connector housings are well known in the art, and can include, for example, alignment holes, matching alignment pins, tongues and grooves, and the like. The same connecting element can be used in a variety of connecting configurations. It can also be used to interface optical fibers to optical devices such as VCSELs and photodetectors using a board mounted alignment ring. It is to be understood that although the disclosure provided herein describes light travelling in one direction through the fiber and the connector, one of skill in the art should realize that light could also travel in the opposite direction through the connector, or could be bi-directional.

In one particular embodiment, the unique interface defined herein can be used for making internal links within high performance computers, servers, or routers. Additional applications in mating to optical back planes can also be envisioned. Some of the prominent features of the connecting elements can include: a molded (or cast, or machined) component having a generally planar mating surface, and a recessed area (pocket) within the mating surface; optical fiber alignment features useful to align the optical fibers; and reflecting surfaces to redirect the optical beam from each fiber so that it is perpendicular to the mating surface. Mechanical alignment features facilitate the alignment of two connecting elements so that their mating surfaces are in contact and their optical paths are aligned.

In some cases, the light redirecting features may collimate the light beam from the fiber. Generally, collimated light can be useful for making fiber-to-fiber connections, since the light beam is generally expanded upon collimation, which makes the connection less susceptible to contamination by foreign material such as dust. In one particular embodiment, the light redirecting features may instead focus the beam so as to create a minimum in the beam size proximate the plane of the mating surface. Generally, focused beams can be useful for making fiber-to-circuit connections such as to a detector, emitter, or other active device disposed on a circuit board, since the light beam can be concentrated to a smaller region to match the emitting or receiving area of the device. In some cases, particularly for optical fiber-to-fiber connections, collimation of the light beam may be preferred, since the collimated light beams are more robust against dirt and other contamination, and also provide for greater alignment tolerances.

In one particular embodiment, the optical fibers can be aligned using waveguide alignment features, such as within molded v-groove features in the unitary light coupling unit, with the v-grooves being parallel to the mating surface; however, v-grooves are not required for alignment in all cases. As described herein, optional parallel v-grooves are included, but it is to be understood that other techniques for alignment and securing of the optical fibers would also be acceptable. Furthermore, v-grooved alignment may not be suitable in some cases and other techniques may be preferred, for example, when the optical waveguide is a polymer waveguide. In some cases, the alignment of the optical waveguides and/or optical fibers can instead be accomplished by any of the techniques known to one of skill in the art of optical fiber alignment using any suitable waveguide alignment feature.

A variety of mechanical feature sets may be used to align a pair of connecting elements. One feature set includes a pair of precisely positioned holes into which alignment pins are placed, similar to the alignment technique used for MT ferrules. In one particular embodiment, if the holes diameters and locations are similar to that of the MT connector, then one of the connecting elements described herein could (with an appropriate set of redirecting elements) intermate with an MT ferrule.

FIG. 1 shows a schematic cross-sectional view of a unitary light coupling unit 100 for use in an optical connector, according to one aspect of the disclosure. The cross-sectional view presented in FIG. 1 is on an XZ plane of an XYZ Cartesian coordinate system, such that the XZ plane passes through a central axis 122 of an optical waveguide 120 that is received and aligned by a waveguide alignment feature 115 in a connector housing 110 of unitary light coupling unit 100. The optical waveguide 120 is received and aligned within the waveguide alignment feature 115 such that the optical waveguide exit face 124 faces an input surface 132 of a light redirecting member 130 disposed in the connector housing 110. In some cases, the light redirecting member 130 can comprise a solid medium that is transparent to the wavelength of light input from the optical waveguide and has an index of refraction that is greater than one. In some cases, the optical waveguide exit face 124 can be immediately adjacent the input surface 132 of the light redirecting member 130; however, in some cases an index matching material can be disposed between them, optically coupling the optical waveguide 120 to the input surface 132. In some cases, the light redirecting member 130 can be a hollow cavity formed in the connector housing 110.

The optical connector is configured to mate with a mating optical connector along a mating direction, the mating direction not being parallel with the central axis 122. To readily accomplish this mating, the connector housing 110 further includes a mating surface 112 and alignment features 114, 116. The alignment features 114, 116, align the output surface 136 of the light redirecting member 130 within the optical connector, to one of either a second unitary light coupling unit 100' in a second optical connector (not shown), or a transceiver such as an optical detector or emitter, such as a vertical cavity surface emitting laser (VCSEL). In one particular embodiment, an optional recessed mating surface 113 can be formed such that a pocket 160 can be formed proximate the output surface 136, so that an air gap can be formed between the output surface 136 and the adjacent second optical connector or transceiver. In one particular embodiment, the unitary light coupling unit 100 can be a hermaphroditic coupling unit, such that the first and a second unitary light coupling unit 100, 100', can be identical and attached to each other, as described elsewhere. In one particular embodiment, at least one of the input surface 132 and the output surface 136 can include an antireflective coating, and/or can be proximate an index matching fluid.

The waveguide alignment member 115 can comprise a groove extending along a groove direction for receiving and aligning the optical waveguide 120, as described, for example, in co-pending PCT Publication Nos. WO2013/048730 entitled OPTICAL CONNECTOR HAVING A PLURALITY OF OPTICAL FIBRES WITH STAGGERED CLEAVED ENDS COUPLED TO ASSOCIATED MICRO-LENSES; WO2013/048743 entitled OPTICAL SUBSTRATE HAVING A PLURALITY OF STAGGERED LIGHT REDIRECTING FEATURES ON A MAJOR SURFACE THEREOF; and in U.S. Patent Application Ser. No. 61/652,478 entitled OPTICAL INTERCONNECT (filed May 14, 2013), and 61/710,083 entitled OPTICAL CONNECTOR (filed Sep. 27, 2013). In some cases, the groove direction can be parallel to and aligned with the central axis 122. In some cases, the waveguide alignment member can instead comprise a cylindrical hole (not shown) capable of receiving and aligning an optical waveguide 120 that can be an optical fiber.

The optical waveguide 120 can be any suitable waveguide including, for example, an optical fiber. In some cases, the optical waveguide 120 is a multimode optical waveguide suitable for wavelengths in a range from about 600 nanometers to about 2000 nanometers. In one particular embodiment, the optical waveguide 120 can have a circular cross-sectional profile. In some cases, however, the optical waveguide can instead have a polygonal cross-sectional profile.

The light redirecting member 130 includes the input surface 132 for receiving input light 140 along an input axis 142 from the optical waveguide 120, a reflective surface 134 for reflecting the received input light 140 as a redirected light 150 propagating along a different redirected axis 152, and an output surface 136 for receiving the redirected light 150 and transmitting the redirected light 150 as an output light 155 propagating along the output axis 156. At least one of the input surface 132 and the output surface 136 can be a planar surface that is substantially perpendicular to the input axis 142 and redirected axis 152, respectively. The redirected axis 152 is also shown to be within a first plane (i.e., the XZ plane) of the XYZ Cartesian coordinate system, and the input axis 142 and redirected axis 152 form a redirection angle φ between them. The redirection angle φ can be any desired angle suitable for the application, and can be, for example, more than 90 degrees, or about 90 degrees, or about 80 degrees, or about 70 degrees, or about 60 degrees, or about 50 degrees, or about 40 degrees, or about 30 degrees, or even less than about 30 degrees. In one particular embodiment shown in FIG. 1, the redirection angle φ is about 90 degrees. In some cases, the central axis 122 of the optical waveguide 120 can be coincident with the input axis, as shown in the figure; however, in some cases the optical fiber can be aligned to the input surface 132 so that the input axis 142 and the central axis 122 form an angle between them (not shown).

Each of the input light and the reflected light diverge or converge in two mutually orthogonal directions, respectively. The input light 140 has a first divergence half-angle $\theta_i$ between the input axis 142 and an input boundary light 144, where the first divergence half-angle $\theta_i$ is between about 3 degrees and about 10 degrees, or between about 5 degrees and about 8 degrees, or about 7 degrees. The redirected light 150 has a second divergence half-angle $\theta_o$ that can, in some cases, be a convergent half-angle $\theta_o$ between the redirected axis 152 and a redirected boundary light 154, where the second divergence is less than the first divergence. In some cases, the second divergence half-angle $\theta_o$ is less than about 5 degrees, or less than about 4 degrees, or less than about 3 degrees, or less than about 2 degrees, or less than about 1 degree. In some cases, light exiting the optical waveguide 120 received and aligned by the waveguide alignment feature 115 propagates along an optical path from the input surface 132 to the output surface 136, such that the redirected light 150 has a minimum beam size (e.g. cross-sectional area) located substantially at the output surface 136. In one particular embodiment, the input light 140 is a divergent light beam, and the redirected light 150 is a convergent light beam or a substantially collimated light beam.

The reflective surface 134 can be any suitably shaped reflector capable of redirecting the input light 140 having a first divergence, to a redirected light 150 having a second divergence that is smaller than the first divergence, and can be a toroidal surface, a parabolic surface, a spherical surface, a hyperbolic surface, or an elliptical surface, although a toroidal surface can be preferred, and is described herein. A curved intersection of the toroidal surface 134 with the XZ plane can be described by an arc 134$a$ having a radius of curvature "R" measured from a radius origin 105. The radius origin 105 lies on a line that bisects the redirection angle $\phi$ between the input axis 142 and the redirected axis 152. The toroidal surface 134 is further characterized by an axis of revolution 106, disposed in the XZ plane, and intersecting the central axis 122 at a focal point 107. In one particular embodiment, the axis of revolution 106 is parallel to the redirected axis 152, for example as shown in FIG. 1. The toroidal surface 134 is generated by revolving the arc 134$a$ about the axis of revolution 106 (i.e., out of the XZ plane), such that a focal length "f" measured from focal point 107 to the intersection of the central axis 122 and the arc 134$a$ is less than the radius of curvature "R", and can be characterized by the expression:

$$R=(2f/\tan\{(\pi-\phi)/2\})(\tan^2\{(\pi-\phi)/2\}+1)^{1/2}$$

where, for example, given a redirection angle $\phi=90$ degrees (i.e., $\pi/2$), the radius of curvature "R" is given by $2f\sqrt{2}$, or 2.828f. In one particular embodiment, the light redirecting member 130 can be designed such that the path of the input light and reflected light travels a combined distance of 2f from the input surface 132 to the output surface 136.

The reflective surface 134 can be made to be reflective by including a reflective coating, such as, for example, a multilayer interference reflector such as a Bragg reflector, or a metal or metal alloy reflector, both of which can be suitable for use with a light redirecting member 130 that is either solid material or a hollow cavity, as described elsewhere. In some cases, for a light redirecting member 130 that is a solid material, the reflective surface 134 can instead use total internal reflection (TIR) to reflect the input light. In order for TIR to be an effective, the connector housing 110 of unitary light coupling unit 100 can further include an internal perimeter 119 at least partially surrounding a cavity 118, positioned such that the reflecting surface 134 of light redirecting member 130 can be protected from interference that can frustrate TIR at the reflecting surface 134, as known to one of skill in the art.

The light redirecting member 130 can be fabricated from any suitably transparent and dimensionally stable material including, for example, polymers such as a polyimide. In one particular embodiment, light redirecting member 130 can be fabricated from a dimensionally stable transparent polyimide material such as, for example, Ultem 1010 Polyetherimide, available from SABIC Innovative Plastics, Pittsfield Mass. In some cases, the optical waveguide 120 can be adhesively secured in the waveguide alignment feature 115. In one particular embodiment, an index matching gel or adhesive may be inserted between the light redirecting member 130 and the optical waveguide 120. By eliminating any air gap in this area, Fresnel losses may be greatly reduced.

Figure 2:
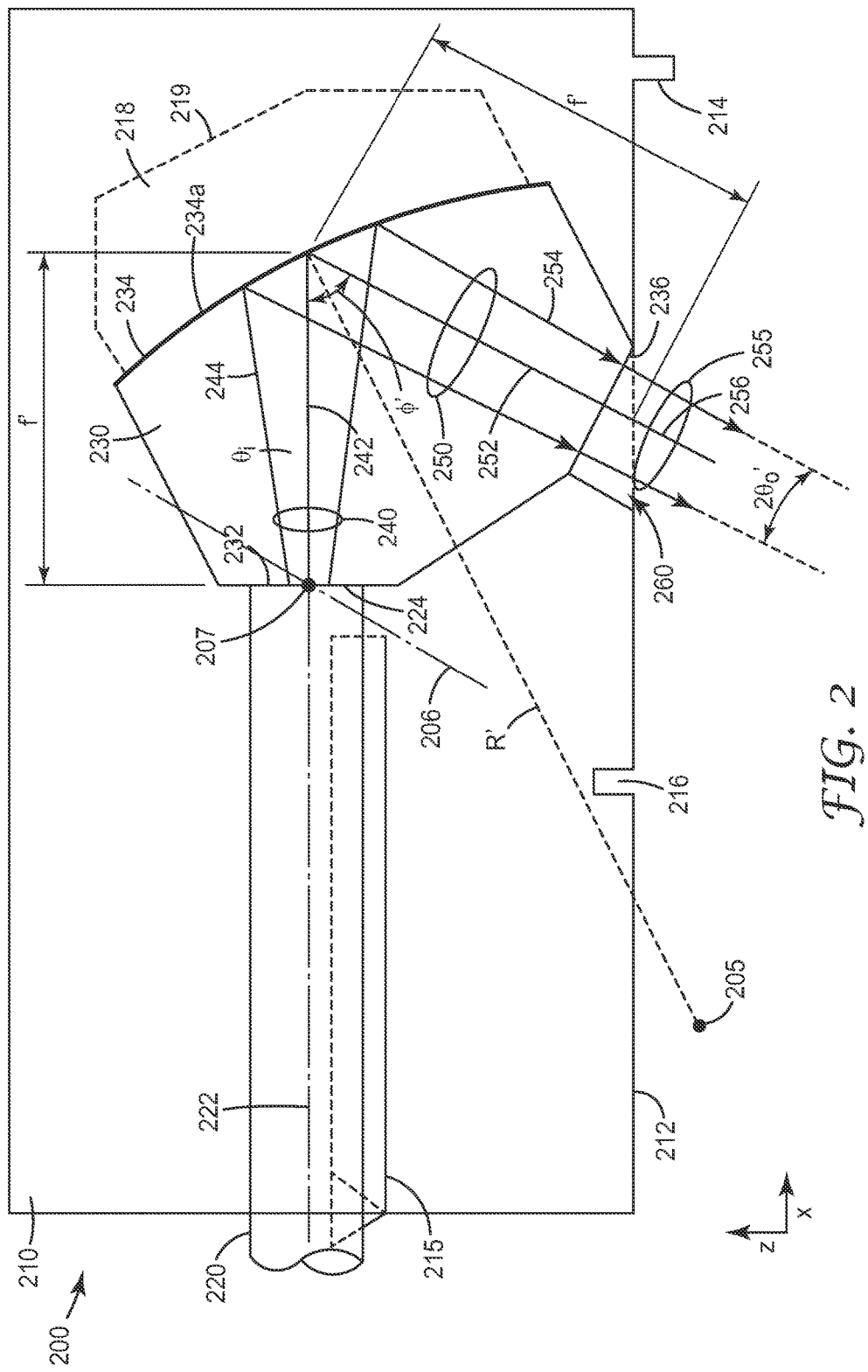
FIG. 2 shows a schematic cross-sectional view of a unitary light coupling unit.

FIG. 2 shows a schematic cross-sectional view of a unitary light coupling unit 200 for use in an optical connector, according to one aspect of the disclosure. Each of the elements 200-260 shown in FIG. 2 correspond to like-numbered elements 100-160 shown in FIG. 1, which have been described previously. For example, optical waveguide 220 of FIG. 2 corresponds to optical waveguide 120 of FIG. 1, and so on. In FIG. 2, input axis 242 and redirected axis 252 form a redirected angle $\phi'$ that is less than 90 degrees. The curved intersection of the toroidal surface 234 with the XZ plane can be described by the arc 234$a$ having a radius of curvature "R" measured from the radius origin 205. The radius origin 205 lies on a line that bisects the redirection angle $\phi'$ between the input axis 242 and the redirected axis 252. The toroidal surface 234 is further characterized by the axis of revolution 206, disposed in the XZ plane, and intersecting the central axis 222 at a focal point 207. In one particular embodiment, the axis of revolution 206 is parallel to the redirected axis 252, for example as shown in FIG. 2. The toroidal surface 234 is generated by revolving the arc 234$a$ about the axis of revolution 206 (i.e., out of the XZ plane), such that a focal length "f'" measured from focal point 207 to the intersection of the central axis 222 and the arc 234$a$ is less than the radius of curvature "R", and the relationship between the focal length f', the redirected angle $\phi'$, and the radius of curvature R' can be calculated by the equation provided elsewhere. In FIG. 2, the redirected angle $\phi'$ can be, for example, 60 degrees, and the input surface 232 and the output surface 236 are each perpendicular to the respective input axis 242 and redirected axis 252; however, the input surface 232 and the output surface 236 are not aligned perpendicular to each other.

The optical connector is configured to mate with a mating optical connector along a mating direction, the mating direction not being parallel with the central axis 222. To readily accomplish this mating, the connector housing 210 includes a mating surface 212 and alignment features 214, 216. The alignment features 214, 216, align the output surface 236 of the light redirecting member 230 within the optical connector, to one of either a second unitary light coupling unit 200' in a second optical connector (not shown), or a transceiver such as an optical detector or emitter, such as a vertical cavity surface emitting laser (VCSEL). In one particular embodiment, a pocket 260 can be formed proximate the output surface 236, so that an air gap can be formed between the output surface 236 and the adjacent second optical connector or transceiver. In one particular embodiment, the unitary light coupling unit 200 can be a hermaphroditic coupling unit, such that the first and a second unitary light coupling unit 200, 200', can be identical and attached to each other, as described elsewhere. In one particular embodiment, at least one of the input surface 232 and the output surface 236 can include an antireflective coating, and/or can be proximate an index matching fluid.

Figure 3A:
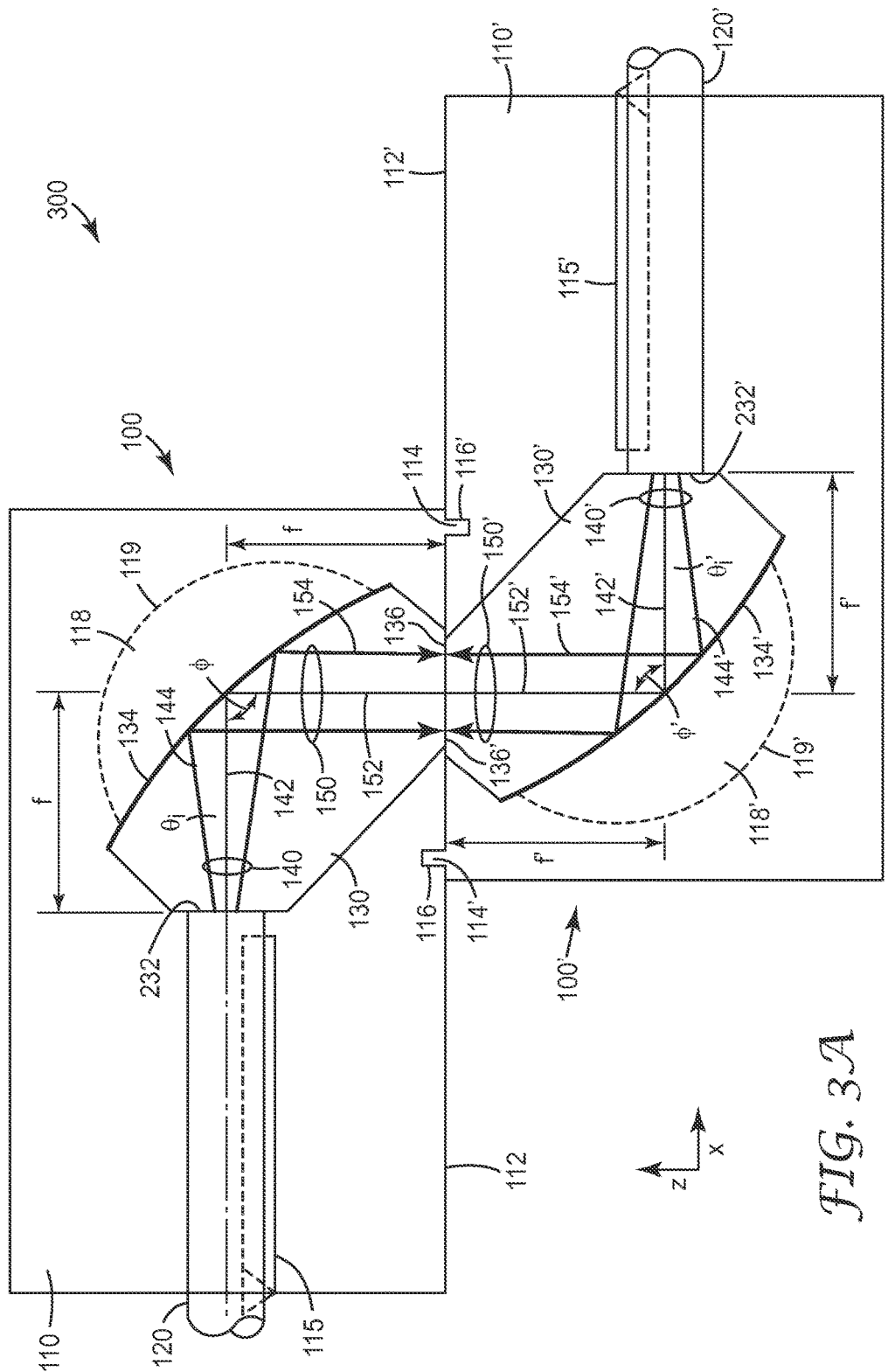
FIG. 3A show a schematic cross-sectional view of a connector assembly.

FIG. 3A show a schematic cross-sectional view of a connector assembly 300, according to one aspect of the disclosure. Each of the elements 100-160 shown in FIG. 3 correspond to like-numbered elements 100-160 shown in FIG. 1, which have been described previously. For example, optical waveguide 120 of FIG. 3 corresponds to optical waveguide 120 of FIG. 1, and so on. In FIG. 3A, connector assembly 300 includes a first unitary light coupling unit 100 and a second unitary light coupling unit 100' that are coupled together such that mating surfaces 112, 112' are adjacent each other; alignment features 114 and 116 are aligned with alignment features 116' and 114', respectively; and the output surface 136 of first unitary light coupling unit 100 is proximate to and facing the output surface 136' of second unitary light coupling unit 100'. In FIG. 3, each of the first unitary light coupling unit 100 and a second unitary light coupling unit 100' are hermaphroditic coupling units, which can be attached to each other. The connector assembly 300 is configured so that light exiting the first optical waveguide 120 enters the second optical waveguide 120' after propagating through the reflective surface 134, 134' of the first and second unitary light coupling units 100, 100'.

The light exiting the first optical waveguide propagates a first propagation distance (f+f+f'+f') between the input surface 132 of the first light redirecting member 130 and the input surface 132' of the second light redirecting member 130', the propagation distance (f+f+f'+f') being substantially equal to two times a sum of the focal length f of the first unitary light coupling unit and the focal length f' of the second unitary light coupling unit. In some cases, the focal length "f" of the first unitary light coupling unit 100 is substantially equal to the focal length "f" of the second unitary light coupling unit 100'. In some cases, the first optical waveguide 120 comprises a first multimode optical fiber and the second optical waveguide 120' comprises a second multimode optical fiber, wherein an optical insertion loss of the connector assembly 300 at a wavelength in a range from 600 to 2000 nanometers is less than 0.5 dB.

Figure 3B:
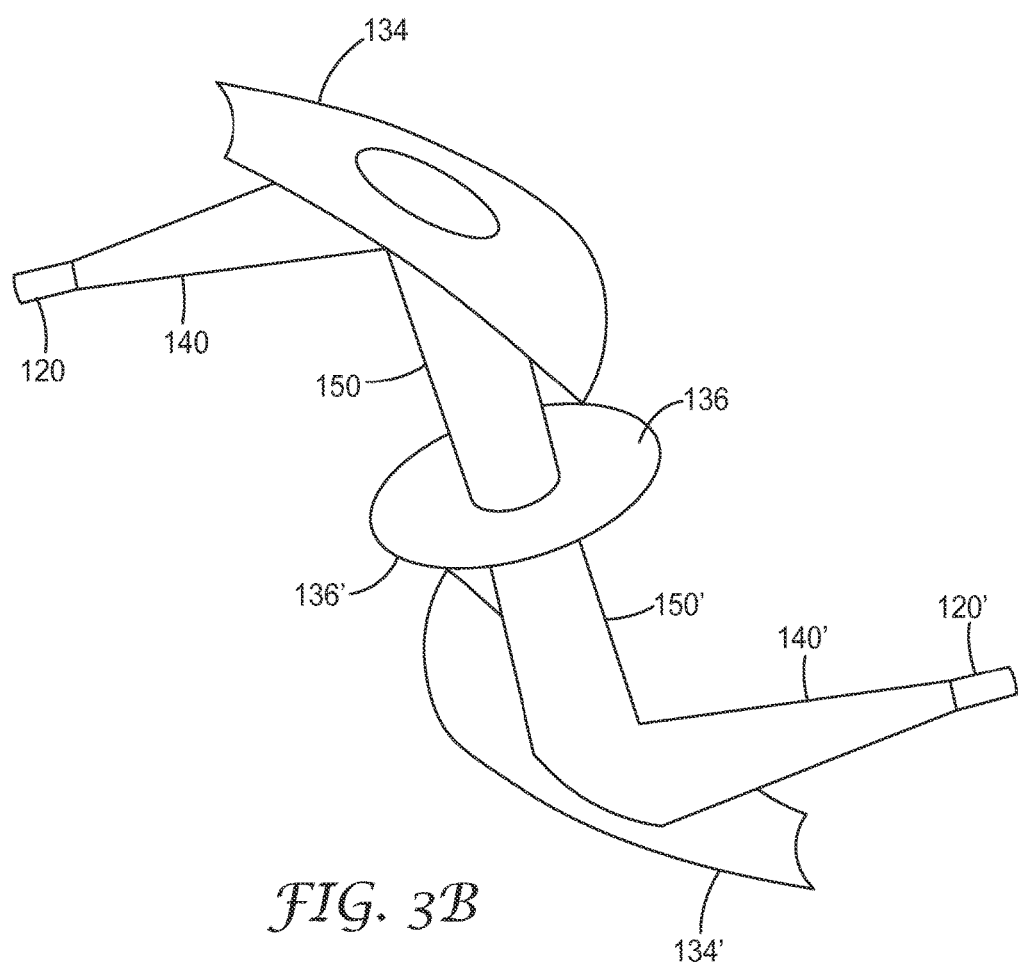
FIG. 3B shows a perspective schematic view of light paths through a connector assembly.

FIG. 3B shows a perspective schematic view of light paths through the connector assembly 300 of FIG. 3A, according to one aspect of the disclosure. In one particular embodiment shown in FIG. 3B, the first and second reflective surfaces 134, 134' are each toroidal reflectors 134, 134'. In FIG. 3B, first optical waveguide 120 injects first input light 140 which is reflected from first toroidal reflector 134 as first redirected light beam 150. First redirected light beam 150 passes through first output surface 136 of first light redirecting member 130 and enters second light redirecting member 130' through second output surface 136' as second redirected light beam 150'. Second redirected light beam 150' is reflected from second toroidal reflector 134' as second input light 140' that enters second optical waveguide 120'.

Figure 4:
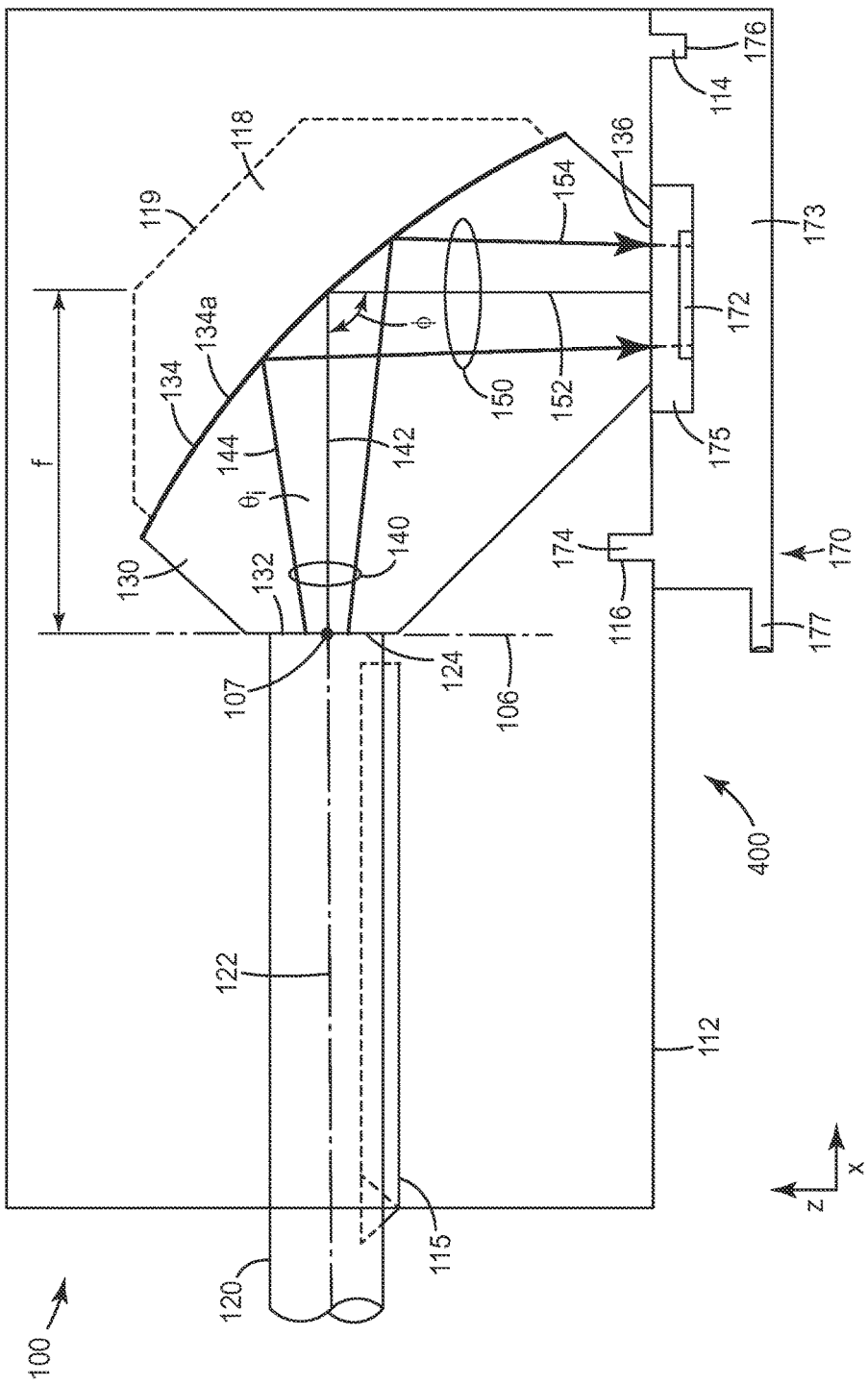
FIG. 4 shows a schematic cross-sectional view of an optical assembly.

FIG. 4 shows a schematic cross-sectional view of an optical assembly 400, according to one aspect of the disclosure. Each of the elements 100-160 shown in FIG. 4 correspond to like-numbered elements 100-160 shown in FIG. 1, which have been described previously. For example, optical waveguide 120 of FIG. 4 corresponds to optical waveguide 120 of FIG. 1, and so on. Optical assembly 400 includes a unitary light coupling unit 100, for example the unitary light coupling unit 100 of FIG. 1, in communication with an optical transceiver 170 configured to receive or emit light from the output surface 136 of the unitary light coupling unit 100.

In one particular embodiment, the optical assembly 400 includes an optical waveguide 120 being multimode in a wavelength range from 600 to 2000 nm and having an optical waveguide exit face 124 and configured to receive or emit light along an input axis 142. The optical assembly further includes a toroidal surface reflector 134 and an optical transceiver 170 configured to receive or emit light along a different redirected axis 152, the optical assembly 400 being configured so that light (e.g., either input light 140 or redirected light 150) propagating from one of the optical waveguide 120 and optical transceiver 170 to the other one of the optical waveguide 120 and optical transceiver 170 undergoes reflection at the toroidal surface reflector 134, a curved intersection (i.e., an arc) 134a of the toroidal surface reflector 134 and a first plane (i.e., the XZ plane) formed by the input axis 142 and the redirected axis 152, having a radius of curvature R, the toroidal surface reflector 134 having an axis of revolution 106 disposed in the first plane (i.e., the XZ plane) at the optical waveguide exit face 124 and a focal length f measured from the axis of revolution 106 to the toroidal surface reflector 134 along the input axis 142, the focal length f being less than the radius of curvature R.

The optical transceiver 170 comprises transceiver alignment features 174, 176, that can align with the alignment features 116, 114 of the unitary light coupling unit 100, a transceiver housing 173 at least partially enclosing a transceiver element 172 that can optionally be recessed within an optional transceiver cavity 175. A conduit 177 provides for communication of the transceiver element 172 to either electrical or optical components. In some cases, the optical transceiver can be an optical detector. In some cases, the optical transceiver can be an optical emitter such as a vertical cavity surface emitting laser (VCSEL).

Figure 5A:
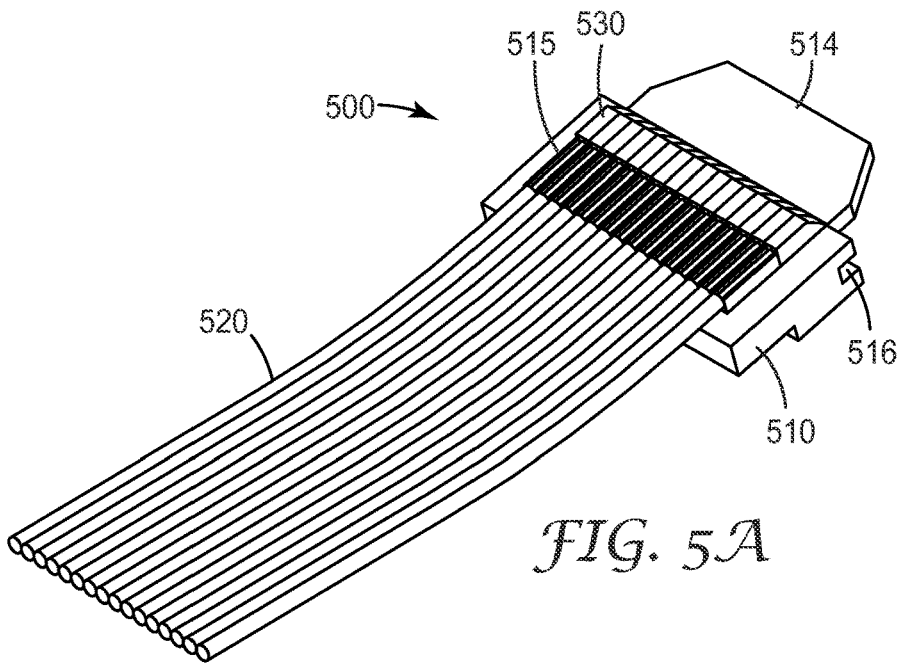
FIG. 5A shows a schematic perspective view of a unitary light coupling unit.

FIG. 5A shows a schematic perspective view of a unitary light coupling unit 500, according to one aspect of the disclosure. Each of the elements 500-530 shown in FIG. 5A correspond to like-numbered elements 100-130 shown in FIG. 1, which have been described previously. For example, optical waveguide 520 of FIG. 5 corresponds to optical waveguide 120 of FIG. 1, and so on. In FIG. 5A, a plurality of optical waveguides 520 are received and aligned by waveguide alignment member 515 to direct light from the optical waveguide to the light redirecting member 530 within connector housing 510. Connector housing 510 includes alignment features 514, 516.

Figure 5B:
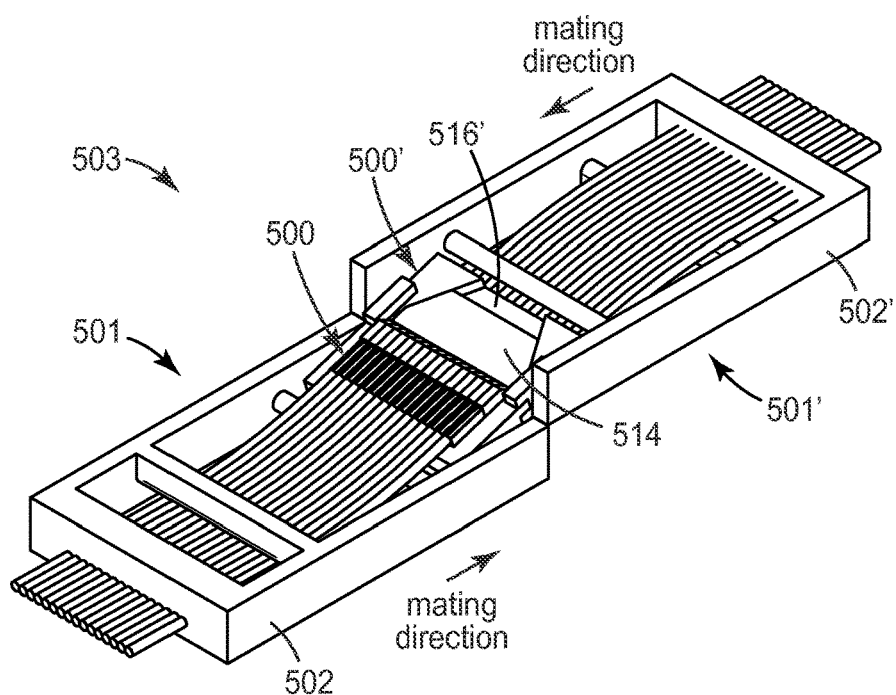
FIG. 5B shows a schematic perspective view of a connector assembly.

FIG. 5B shows a schematic perspective view of a connector assembly 503, according to one aspect of the disclosure. The connector assembly 503 can be similar to those multifiber connector assemblies shown, for example, in U.S. Patent Application Ser. No. 61/652,478 entitled OPTICAL INTERCONNECT (filed May 14, 2013), which provides compact, reliable optical interconnects; however, the light redirecting member 530 of the present disclosure provides advantages in multifiber connector assemblies that were not previously appreciated. Connecter assembly 503 includes a first optical connector 501 having a first unitary light coupling unit 500 and a second optical connector 501' having a second unitary light coupling unit 500', according to one aspect of the disclosure. Each of the first and second unitary light coupling units 500, 500' can be hermaphroditic connectors, as described elsewhere. The first and second optical connectors 501, 501' can be protected and supported by first and second connector frames 502, 502', that can enable more reliable matching of the respective first and second alignment features 514, 516, 514', 516' of each of the unitary light coupling units 500, 500'.

Each of the multifiber connector assemblies can be adapted to be interconnected using a variety of connection schemes, as known in the art, for example as further described in co-pending PCT Publication Nos. WO2013/048730 entitled OPTICAL CONNECTOR HAVING A PLURALITY OF OPTICAL FIBRES WITH STAGGERED CLEAVED ENDS COUPLED TO ASSOCIATED MICROLENSES; WO2013/048743 entitled OPTICAL SUBSTRATE HAVING A PLURALITY OF STAGGERED LIGHT REDIRECTING FEATURES ON A MAJOR SURFACE THEREOF; and in U.S. Patent Application Ser. No. 61/652,478 entitled OPTICAL INTERCONNECT (filed May 14, 2013), and 61/710,083 entitled OPTICAL CONNECTOR (filed Sep. 27, 2013).

Following are a list of embodiments of the present disclosure.

Item 1 is a unitary light coupling unit for use in an optical connector, comprising: a waveguide alignment member for receiving and aligning an optical waveguide; and a light redirecting member, comprising: an input surface for receiving input light from an optical waveguide disposed and aligned at the waveguide alignment member; a toroidal surface for receiving light from the input surface propagating along an input axis and reflecting the received light, the reflected light propagating along a different redirected axis, a second divergence of the reflected light being less than a first divergence of the input light along two mutually orthogonal divergence directions; and an output surface for receiving light from the toroidal surface and transmitting the received light as output light exiting the light redirecting member propagating along an output axis, a curved intersection of the toroidal surface and a first plane formed by the input and redirected axes having a radius of curvature, the toroidal surface having an axis of revolution disposed in the first plane at the input surface and a focal length measured from the axis of revolution to the toroidal surface along the input axis, the focal length being less than the radius of curvature.

Item 2 is the unitary light coupling unit of item 1, wherein the axis of revolution is substantially parallel to the redirected axis.

Item 3 is the unitary light coupling unit of item 1 or item 2, wherein the optical connector is configured to mate with a mating optical connector along a mating direction, the mating direction not being parallel with the input axis.

Item 4 is the unitary light coupling unit of item 1 to item 3, wherein the optical connector is configured to mate with a mating optical connector along a mating direction, the mating direction being parallel with the input axis.

Item 5 is the unitary light coupling unit of item 1 or item 4, wherein the optical connector comprises an input face different than the input surface.

Item 6 is the unitary light coupling unit of item 1 to item 5, wherein the optical connector comprises an output face different than the output surface.

Item 7 is the unitary light coupling unit of item 1 to item 6, wherein the optical connector is hermaphroditic.

Item 8 is the unitary light coupling unit of item 1 to item 7, wherein the waveguide alignment member comprises a groove extending along a groove direction for receiving and aligning an optical waveguide.

Item 9 is the unitary light coupling unit of item 8, wherein the groove direction is parallel to and aligned with the input axis.

Item 10 is the unitary light coupling unit of item 1 to item 9, wherein the optical waveguide comprises an optical fiber.

Item 11 is the unitary light coupling unit of item 10, wherein the waveguide alignment member comprises a cylindrical hole capable of receiving the optical fiber.

Item 12 is the unitary light coupling unit of item 1 to item 11, wherein the optical waveguide is multimode for wavelengths in a range from 600 to 2000 nanometers.

Item 13 is the unitary light coupling unit of item 1 to item 12, wherein the optical waveguide has a circular cross-sectional profile.

Item 14 is the unitary light coupling unit of item 1 to item 13, wherein the optical waveguide has a polygonal cross-sectional profile.

Item 15 is the unitary light coupling unit of item 1 to item 14, wherein a central light ray exiting the optical waveguide received and aligned by the waveguide alignment member propagates along a central axis between the optical waveguide and the input surface, the central axis being parallel to and aligned with the input axis.

Item 16 is the unitary light coupling unit of item 1 to item 15, further comprising an optical waveguide received and aligned by the waveguide alignment member, and an index matching material optically coupling the optical waveguide to the input surface.

Item 17 is the unitary light coupling unit of item 1 to item 16, wherein the input surface is planar.

Item 18 is the unitary light coupling unit of item 1 to item 17, wherein the input surface is substantially perpendicular to the input axis.

Item 19 is the unitary light coupling unit of item 1 to item 18, wherein the input surface is substantially perpendicular to the output surface.

Item 20 is the unitary light coupling unit of item 1 to item 19, wherein light exiting an optical waveguide received and aligned by the waveguide alignment member propagates along an optical path from the input surface to the output surface, an index of refraction of unitary light coupling unit along the entire optical path being greater than one.

Item 21 is the unitary light coupling unit of item 1 to item 20, wherein the light redirecting member is a solid medium having an index of refraction greater than one.

Item 22 is the unitary light coupling unit of item 1 to item 21, wherein an angle between the input axis and the redirected axis is less than 90 degrees.

Item 23 is the unitary light coupling unit of item 1 to item 22, wherein an angle between the input axis and the redirected axis is greater than 90 degrees.

Item 24 is the unitary light coupling unit of item 1 to item 23, wherein an angle between the input axis and the redirected axis is 111 degrees.

Item 25 is the unitary light coupling unit of item 1 to item 24, wherein the second divergence of the reflected light is less than the first divergence of the input light along each of the two mutually orthogonal divergence directions by at least 1 degree.

Item 26 is the unitary light coupling unit of item 1 to item 25, wherein light exiting an optical waveguide received and aligned by the waveguide alignment member and reflected by the toroidal surface propagates from the toroidal surface to the output surface, the reflected light having a minimum beam size located substantially at the output surface.

Item 27 is the unitary light coupling unit of item 1 to item 26, wherein the toroidal surface reflects the received light by total internal reflection.

Item 28 is the unitary light coupling unit of item 1 to item 27, wherein the toroidal surface comprises a Bragg reflector.

Item 29 is the unitary light coupling unit of item 1 to item 28, wherein the toroidal surface comprises a metal reflector.

Item 30 is the unitary light coupling unit of item 1 to item 29, wherein the output axis lies in the first plane.

Item 31 is the unitary light coupling unit of item 1 to item 30, wherein the output surface is substantially planar.

Item 32 is the unitary light coupling unit of item 1 to item 31, wherein the output surface is substantially perpendicular to the output axis.

Item 33 is the unitary light coupling unit of item 1 to item 32, wherein light exiting an optical waveguide received and aligned by the waveguide alignment member has first beam size at the input surface and a second beam size at the output surface, the second beam size being greater than the first beam size.

Item 34 is the unitary light coupling unit of item 33, wherein the second beam size is greater than about 2 times the first beam size.

Item 35 is the unitary light coupling unit of item 1 to item 34, wherein within the light redirecting member the input light is divergent and the reflected light is convergent or substantially collimated.

Item 36 is a connector assembly, comprising: a first unitary light coupling unit of item 1 to item 35 having a first optical waveguide received and aligned by the waveguide alignment member of the first unitary light coupling unit mated with a second unitary light coupling unit of item 1 to item 35 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Item 37 is the connector assembly of item 36, wherein light exiting the first optical waveguide propagates a first propagation distance between the input surface of the first unitary light coupling unit and the input surface of the second unitary light coupling unit, the propagation distance being substantially equal to two times a sum of the focal length of the first unitary light coupling unit and the focal length of the second unitary light coupling unit.

Item 38 is the connector assembly of item 36 or item 37, wherein the focal length of the first unitary light coupling unit is substantially equal to the focal length of the second unitary light coupling unit.

Item 39 is the connector assembly of item 36 to item 38, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Item 40 is a unitary light coupling unit for use in an optical connector, comprising: a waveguide alignment member for receiving and aligning an optical waveguide; and a solid light redirecting member comprising: an input surface for receiving input light from an optical waveguide disposed and aligned at the waveguide alignment member; a reflecting surface for receiving light from the input surface propagating along an input axis and reflecting the received light, the reflected light propagating along a different redirected axis, a second divergence of the reflected light being less than a first divergence of the input light along two mutually orthogonal divergence directions; and an output surface for receiving light from the reflecting surface and transmitting the received light as output light exiting the light redirecting member propagating along an output axis, wherein the reflecting surface comprises a reflective coating, and wherein without the reflective coating at least a portion of the light received by the reflecting surface from the input surface does not undergo total internal reflection at the reflecting surface.

Item 41 is the unitary light coupling unit of item 40, wherein the reflective coating comprises a metal.

Item 42 is the unitary light coupling unit of item 40 or item 41, wherein the optical connector is configured to mate with a mating optical connector along a mating direction, the mating direction not being parallel with the input axis.

Item 43 is the unitary light coupling unit of item 40 to item 42, wherein the optical connector is configured to mate with a mating optical connector along a mating direction, the mating direction being parallel with the input axis.

Item 44 is the unitary light coupling unit of item 40 to item 43, wherein the optical connector comprises an input face different than the input surface.

Item 45 is the unitary light coupling unit of item 40 to item 44, wherein the optical connector comprises an output face different than the output surface.

Item 46 is the unitary light coupling unit of item 40 to item 45, wherein the optical connector is hermaphroditic.

Item 47 is the unitary light coupling unit of item 40 to item 46, wherein the waveguide alignment member comprises a groove extending along a groove direction for receiving and aligning an optical waveguide.

Item 48 is the unitary light coupling unit of item 47, wherein the groove direction is parallel to and aligned with the input axis.

Item 49 is the unitary light coupling unit of item 40 to item 48, wherein the optical waveguide comprises an optical fiber.

Item 50 is the unitary light coupling unit of item 41 to item 49, wherein the waveguide alignment member comprises a cylindrical hole capable of receiving the optical fiber.

Item 51 is the unitary light coupling unit of item 40 to item 50, wherein the optical waveguide is multimode for wavelengths in a range from 600 to 2000 nanometers.

Item 52 is the unitary light coupling unit of item 40 to item 51, wherein the optical waveguide has a circular cross-sectional profile.

Item 53 is the unitary light coupling unit of item 40 to item 52, wherein the optical waveguide has a polygonal cross-sectional profile.

Item 54 is the unitary light coupling unit of item 40 to item 53, wherein a central light ray exiting the optical waveguide received and aligned by the waveguide alignment member propagates along a central axis between the optical waveguide and the input surface, the central axis being parallel to and aligned with the input axis.

Item 55 is the unitary light coupling unit of item 40 to item 54, further comprising an optical waveguide received and aligned by the waveguide alignment member, and an index matching material optically coupling the optical waveguide to the input surface.

Item 56 is the unitary light coupling unit of item 33 to item 55, wherein the input surface is planar.

Item 57 is the unitary light coupling unit of item 40 to item 56, wherein the input surface is substantially perpendicular to the input axis.

Item 58 is the unitary light coupling unit of item 40 to item 57, wherein the input surface is substantially perpendicular to the output surface.

Item 59 is the unitary light coupling unit of item 40 to item 58, wherein an angle between the input axis and the redirected axis is less than 90 degrees.

Item 60 is the unitary light coupling unit of item 40 to item 59, wherein the second divergence of the reflected light is less than the first divergence of the input light along each of the two mutually orthogonal divergence directions by at least 1 degree.

Item 61 is the unitary light coupling unit of item 40 to item 60, wherein light exiting an optical waveguide received and aligned by the waveguide alignment member and reflected by the reflecting surface propagates along an optical path from the reflecting surface to the output surface, the reflected light having a minimum beam size located substantially at the output surface.

Item 62 is the unitary light coupling unit of item 40 to item 61, wherein the reflective coating comprises a Bragg reflector.

Item 63 is the unitary light coupling unit of item 40 to item 62, wherein the reflective surface comprises a toroidal surface, a parabolic surface, a spherical surface, a hyperbolic surface, or an elliptical surface.

Item 64 is the unitary light coupling unit of item 40 to item 63, wherein the output axis lies in a first plane formed by the input and redirected axes.

Item 65 is the unitary light coupling unit of item 40 to item 64, wherein the output surface is substantially planar.

Item 66 is the unitary light coupling unit of item 40 to item 65, wherein the output surface is substantially perpendicular to the output axis.

Item 67 is the unitary light coupling unit of item 40 to item 66, wherein light exiting an optical waveguide received and aligned by the waveguide alignment member has first beam size at the input surface and a second beam size at the output surface, the second beam size being greater than the first beam size.

Item 68 is the unitary light coupling unit of item 67, wherein the second beam size is greater than about 2 times the first beam size.

Item 69 is the unitary light coupling unit of item 40 to item 68, wherein within the light redirecting member the input light is divergent and the reflected light is convergent or substantially collimated.

Item 70 is a connector assembly, comprising: a first unitary light coupling unit of item 40 to item 69 having a first optical waveguide received and aligned by the waveguide alignment member of the first unitary light coupling unit mated with a second unitary light coupling unit of item 40 to item 69 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Item 71 is the connector assembly of item 70, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Item 72 is a unitary light coupling unit for use in an optical connector, comprising: a waveguide alignment member for receiving and aligning an optical waveguide; and a light redirecting member comprising: an input surface for receiving input light from an optical waveguide disposed and aligned at the waveguide alignment member; a reflecting surface for receiving light from the input surface as an incident light propagating along an input axis and reflecting the incident light as a reflected light propagating along a different redirected axis, a second divergence of the reflected light being less than a first divergence of the input light along two mutually orthogonal divergence directions; and an output surface for receiving the reflected light and transmitting the received light as output light exiting the light redirecting member propagating along an output axis, wherein an angle between the incident and reflected lights is less than 90 degrees.

Item 73 is the unitary light coupling unit of item 72, wherein the angle between the incident and reflected lights is less than or equal to about 60 degrees.

Item 74 is the unitary light coupling unit of item 72 or item 73, wherein the optical connector is configured to mate with a mating optical connector along a mating direction, the mating direction not being parallel with the input axis.

Item 75 is the unitary light coupling unit of item 72 to item 74, wherein the optical connector is configured to mate with a mating optical connector along a mating direction, the mating direction being parallel with the input axis.

Item 76 is the unitary light coupling unit of item 72 to item 75, wherein the optical connector comprises an input face different than the input surface.

Item 77 is the unitary light coupling unit of item 72 to item 76, wherein the optical connector comprises an output face different than the output surface.

Item 78 is the unitary light coupling unit of item 72 to item 77, wherein the optical connector is hermaphroditic.

Item 79 is the unitary light coupling unit of item 72 to item 78, wherein the waveguide alignment member comprises a groove extending along a groove direction for receiving and aligning an optical waveguide.

Item 80 is the unitary light coupling unit of item 79, wherein the groove direction is parallel to and aligned with the input axis.

Item 81 is the unitary light coupling unit of item 72 to item 80, wherein the optical waveguide comprises an optical fiber.

Item 82 is the unitary light coupling unit of item 81, wherein the waveguide alignment member comprises a cylindrical hole capable of receiving the optical fiber.

Item 83 is the unitary light coupling unit of item 72 to item 82, wherein the optical waveguide is multimode for wavelengths in a range from 600 to 2000 nanometers.

Item 84 is the unitary light coupling unit of item 72 to item 83, wherein the optical waveguide has a circular cross-sectional profile.

Item 85 is the unitary light coupling unit of item 72 to item 84, wherein the optical waveguide has a polygonal cross-sectional profile.

Item 86 is the unitary light coupling unit of item 72 to item 85, wherein a central light ray exiting the optical waveguide received and aligned by the waveguide alignment member propagates along an input path between the input surface and the reflecting surface, the input path being parallel to and aligned with the input axis.

Item 87 is the unitary light coupling unit of item 86, wherein the central light ray is reflected by the reflecting surface, and further propagates along a reflected path to the output surface, the reflected path and the input path forming the angle of less than 90 degrees.

Item 88 is the unitary light coupling unit of item 72 to item 87, further comprising an optical waveguide received and aligned by the waveguide alignment member, and an index matching material optically coupling the optical waveguide to the input surface.

Item 89 is the unitary light coupling unit of item 72 to item 88, wherein the input surface is planar.

Item 90 is the unitary light coupling unit of item 72 to item 89, wherein the input surface is substantially perpendicular to the input axis.

Item 91 is the unitary light coupling unit of item 72 to item 90, wherein the input surface is substantially perpendicular to the output surface.

Item 92 is the unitary light coupling unit of item 72 to item 91, wherein light exiting an optical waveguide received and aligned by the waveguide alignment member propagates along an optical path from the input surface to the output surface, an index of refraction of unitary light coupling unit along the entire optical path being greater than one.

Item 93 is the unitary light coupling unit of item 72 to item 92, wherein the light redirecting member is a solid medium having an index of refraction greater than one.

Item 94 is the unitary light coupling unit of item 72 to item 93, wherein the angle between the input axis and the redirected axis is less than 90 degrees.

Item 95 is the unitary light coupling unit of item 72 to item 94, wherein the second divergence of the reflected light is less than the first divergence of the input light along each of the two mutually orthogonal divergence directions by at least 1 degree.

Item 96 is the unitary light coupling unit of item 72 to item 95, wherein light exiting an optical waveguide received and aligned by the waveguide alignment member and reflected by the reflecting surface propagates along an optical path from the reflecting surface to the output surface, the reflected light having a minimum beam size located substantially at the output surface.

Item 97 is the unitary light coupling unit of item 72 to item 96, wherein the reflecting surface comprises a toroidal surface, a parabolic surface, a spherical surface, a hyperbolic surface, or an elliptical surface.

Item 98 is the unitary light coupling unit of item 72 to item 97, wherein the reflecting surface reflects the received light by total internal reflection.

Item 99 is the unitary light coupling unit of item 72 to item 98, wherein the reflecting surface comprises a Bragg reflector.

Item 100 is the unitary light coupling unit of item 72 to item 99, wherein the reflecting surface comprises a metal reflector.

Item 101 is the unitary light coupling unit of item 72 to item 100, wherein the output axis lies in a first plane formed by the input and redirected axes.

Item 102 is the unitary light coupling unit of item 72 to item 101, wherein the output surface is substantially planar.

Item 103 is the unitary light coupling unit of item 72 to item 102, wherein the output surface is substantially perpendicular to the output axis.

Item 104 is the unitary light coupling unit of item 72 to item 103, wherein light exiting an optical waveguide received and aligned by the waveguide alignment member has first beam size at the input surface and a second beam size at the output surface, the second beam size being greater than the first beam size.

Item 105 is the unitary light coupling unit of item 104, wherein the second beam size is greater than about 2 times the first beam size.

Item 106 is the unitary light coupling unit of item 72 to item 105, wherein within the light redirecting member the input light is divergent and the reflected light is convergent or substantially collimated.

Item 107 is a connector assembly, comprising: a first unitary light coupling unit of item 72 to item 106 having a first optical waveguide received and aligned by the waveguide alignment member of the first unitary light coupling unit mated with a second unitary light coupling unit of item 72 to item 106 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

Item 108 is the connector assembly of item 107, wherein the first optical waveguide comprises a first multimode optical fiber and the second optical waveguide comprises a second multimode optical fiber, wherein an optical insertion loss of the connector assembly at a wavelength in a range from 600 to 2000 nanometers is less than 0.5 dB.

Item 109 is a connector assembly comprising mated first and second optical connectors, each optical connector comprising: a multimode optical waveguide having an exit face; and a unitary light redirecting member comprising: a first surface disposed at and facing the exit face of the multimode optical waveguide; a second surface disposed at and facing the second surface of the unitary light redirecting member of other optical connector; and a reflecting surface for receiving light from one of the first and second surfaces and reflecting the received light toward the other of the first and second surfaces, wherein an optical insertion loss of the connector assembly at a wavelength in a range from 600 to 2000 nanometers is less than 0.5 dB.

Item 110 is the connector assembly of item 109, wherein the reflecting surface of at least one of the first and second optical connectors is a toroidal surface.

Item 111 is the connector assembly of item 109 or item 110, wherein the multimode optical waveguide of each of the first and second optical connectors is a multimode optical fiber.

Item 112 is the connector assembly of item 109 to item 111, wherein the multimode optical waveguide of at least one optical connector has a circular cross-sectional profile.

Item 113 is the connector assembly of item 109 to item 112, wherein the multimode optical waveguide of at least one optical connector has a polygonal cross-sectional profile.

Item 114 is the connector assembly of item 109 to item 113, wherein the reflecting surface of at least one of the first and second optical connectors reflects the received light by total internal reflection.

Item 115 is the connector assembly of item 109 to item 114, wherein the reflecting surface of at least one of the first and second optical connectors comprises a Bragg reflector.

Item 116 is the connector assembly of item 109 to item 115, wherein the reflecting surface of at least one of the first and second optical connectors comprises a metal reflector.

Item 117 is an optical assembly comprising: an optical fiber being multimode in a wavelength range from 600 to 2000 nm and having an exit face and configured to receive or emit light along a first optical axis; a toroidal surface; and an optical transceiver configured to receive or emit light along a different second optical axis, the optical assembly being configured so that light propagating from one of the optical fiber and transceiver to the other one of the optical fiber and transceiver undergoes reflection at the toroidal surface, a curved intersection of the toroidal surface and a first plane formed by the first and second optical axes having a radius of curvature, the toroidal surface having an axis of revolution disposed in the first plane at the exit face and a focal length measured from the axis of revolution to the toroidal surface along the first optical axis, the focal length being less than the radius of curvature.

Item 118 is the optical assembly of item 117, wherein the optical transceiver comprises an optical detector.

Item 119 is the optical assembly of item 117 or item 118, wherein the optical transceiver comprises a vertical cavity surface emitting laser (VCSEL).

Item 120 is the optical assembly of item 117 to item 119, wherein the toroidal surface reflects the received light by total internal reflection.

Item 121 is the optical assembly of item 117 to item 120, wherein the toroidal surface comprises a Bragg reflector.

Item 122 is the optical assembly of item 117 to item 121, wherein the toroidal surface comprises a metal reflector.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A unitary light coupling unit for use in an optical connector, comprising:
    a waveguide alignment member for receiving and aligning an optical waveguide; and
    a light redirecting member, comprising:
        an input surface for receiving input light from an optical waveguide disposed and aligned at the waveguide alignment member;
        a toroidal surface for receiving light from the input surface propagating along an input axis and reflecting the received light, the reflected light propagating along a different redirected axis, a second divergence of the reflected light being less than a first divergence of the input light along two mutually orthogonal divergence directions; and
        an output surface for receiving light from the toroidal surface and transmitting the received light as output light exiting the light redirecting member propagating along an output axis, a curved intersection of the toroidal surface and a first plane formed by the input and redirected axes having a radius of curvature, the toroidal surface being a surface of revolution of a circular arc and having an axis of revolution disposed in the first plane at the input surface and a focal length measured from the axis of revolution to the toroidal surface along the input axis, the focal length being less than the radius of curvature, wherein the axis of revolution and the reflected light are substantially parallel to the redirected axis, and wherein the unitary light coupling unit is configured to optically couple a first multimode optical waveguide to a second multimode optical waveguide with an optical insertion loss at a wavelength in a range from 600 to 2000 nanometers of less than 0.5 dB when the first multimode optical waveguide is received and aligned by the waveguide alignment member and the second multimode optical waveguide is received and aligned by a waveguide alignment member of a mating light coupling unit mated with the unitary light coupling unit and having a same size and shape as the unitary light coupling unit.

2. The unitary light coupling unit of claim 1, wherein the optical connector is configured to mate with a mating optical connector along a mating direction, the mating direction not being parallel with the input axis.

3. The unitary light coupling unit of claim 1, wherein the optical connector is configured to mate with a mating optical connector along a mating direction, the mating direction being parallel with the input axis.

4. The unitary light coupling unit of claim 1, wherein the waveguide alignment member comprises a groove extending along a groove direction for receiving and aligning an optical waveguide.

5. The unitary light coupling unit of claim 4, wherein the groove direction is parallel to and aligned with the input axis.

6. The unitary light coupling unit of claim 1, wherein the optical waveguide comprises an optical fiber.

7. The unitary light coupling unit of claim 6, wherein the waveguide alignment member comprises a cylindrical hole capable of receiving the optical fiber.

8. The unitary light coupling unit of claim 1, wherein the optical waveguide is multimode for wavelengths in a range from 600 to 2000 nanometers.

9. The unitary light coupling unit of claim 1, wherein a central light ray exiting the optical waveguide received and aligned by the waveguide alignment member propagates along a central axis between the optical waveguide and the input surface, the central axis being parallel to and aligned with the input axis.

10. The unitary light coupling unit of claim 1 further comprising an optical waveguide received and aligned by the waveguide alignment member, and an index matching material optically coupling the optical waveguide to the input surface.

11. The unitary light coupling unit of claim 1, wherein the input surface is planar.

12. The unitary light coupling unit of claim 1, wherein the input surface is substantially perpendicular to the input axis.

13. The unitary light coupling unit of claim 1, wherein the input surface is substantially perpendicular to the output surface.

14. The unitary light coupling unit of claim 1, wherein light exiting an optical waveguide received and aligned by the waveguide alignment member propagates along an optical path from the input surface to the output surface, an index of refraction of unitary light coupling unit along the entire optical path being greater than one.

15. A connector assembly, comprising:
a first unitary light coupling unit of claim 1 having a first optical waveguide received and aligned by the waveguide alignment member of the first unitary light coupling unit mated with a second unitary light coupling unit of claim 1 having a second optical waveguide received and aligned by the waveguide alignment member of the second unitary light coupling unit, the output surface of the first unitary light coupling unit being proximate to and facing the output surface of the second unitary light coupling unit, the connector assembly being configured so that light exiting the first optical waveguide enters the second optical waveguide after propagating through the light redirecting members of the first and second unitary light coupling units.

16. The unitary light coupling unit of claim 1, wherein an angle between the input light and the reflected light is about 90 degrees.

17. The unitary light coupling unit of claim 1, wherein an angle between the input light and the reflected light is 80 degrees or less.

18. A unitary light coupling unit for use in an optical connector, comprising:
a waveguide alignment member for receiving and aligning an optical waveguide; and
a light redirecting member, comprising:
an input surface for receiving input light from an optical waveguide disposed and aligned at the waveguide alignment member;
a toroidal surface for receiving light from the input surface propagating along an input axis and reflecting the received light, the reflected light propagating along a different redirected axis, an angle between the input light and the reflected light being 80 degrees or less, a second divergence of the reflected light being less than a first divergence of the input light along two mutually orthogonal divergence directions; and
an output surface for receiving light from the toroidal surface and transmitting the received light as output light exiting the light redirecting member propagating along an output axis, a curved intersection of the toroidal surface and a first plane formed by the input and redirected axes having a radius of curvature, the toroidal surface being a surface of revolution of a circular arc and having an axis of revolution disposed in the first plane at the input surface and a focal length measured from the axis of revolution to the toroidal surface along the input axis, the focal length being less than the radius of curvature, wherein the axis of revolution and the reflected light are substantially parallel to the redirected axis and
wherein the unitary light coupling unit is configured to optically couple a first multimode optical waveguide to a second multimode optical waveguide with an optical insertion loss at a wavelength in a range from 600 to 2000 nanometers of less than 0.5 dB when the first multimode optical waveguide is received and aligned by the waveguide alignment member and the second multimode optical waveguide is received and aligned by a waveguide alignment member of a mating light coupling unit mated with the unitary light coupling unit and having a same size and shape as the unitary light coupling unit.

19. The unitary light coupling unit of claim 18, wherein the angle between the input light and the reflected light is about 60 degrees or less.

20. A connector assembly, comprising:
a first unitary light coupling unit of claim 18 having a first multimode optical fiber received and aligned by the waveguide alignment member of the first unitary light coupling unit mated with a second unitary light coupling unit of claim 18 having a second multimode optical fiber received and aligned by the waveguide alignment member of the second unitary light coupling unit, the output surface of the first unitary light coupling unit being proximate to and facing the output surface of the second unitary light coupling unit, the connector assembly being configured so that light exiting the first multimode optical fiber enters the second multimode optical fiber after propagating through the light redirecting members of the first and second unitary light coupling units.

* * * * *